US011412419B2

(12) United States Patent
Ozturk et al.

(10) Patent No.: US 11,412,419 B2
(45) Date of Patent: Aug. 9, 2022

(54) COMMUNICATIONS DURING HANDOVER PROCEDURE

(71) Applicant: QUALCOMM Incorporated, San Diego, CA (US)

(72) Inventors: Ozcan Ozturk, San Diego, CA (US); Karthika Paladugu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/842,194

(22) Filed: Apr. 7, 2020

(65) Prior Publication Data
US 2020/0336950 A1 Oct. 22, 2020

Related U.S. Application Data

(60) Provisional application No. 62/836,589, filed on Apr. 19, 2019.

(51) Int. Cl.
*H04W 36/00* (2009.01)
*H04W 76/27* (2018.01)
(Continued)

(52) U.S. Cl.
CPC ... *H04W 36/0027* (2013.01); *H04W 36/0079* (2018.08); *H04W 72/14* (2013.01);
(Continued)

(58) Field of Classification Search
CPC ............ H04W 36/0027; H04W 76/27; H04W 36/0079; H04W 72/14; H04W 80/08;
(Continued)

(56) References Cited

U.S. PATENT DOCUMENTS 10,306,521 B2* 5/2019 Nigam ................ H04W 36/28
2015/0264621 A1* 9/2015 Sivanesan ......... H04W 36/0069
455/436

(Continued)

OTHER PUBLICATIONS

CMCC: "Considerations on DC-based HO and SCG Change," 3GPP Draft, 3GPP TSG-RAN WG2 #105bis, R2-1904359, Considerations on DC-based HO and SCG Change, 3rd Generation Partnership Project (3GPP), Mobile Competence Centre, 650, Route Des Lucioles, F-06921, Sophia-Antipolis Cedex, France, vol. RAN WG2, No. Xi 'an, China; Apr. 8, 2019-Apr. 12, 2019, Apr. 6, 2019 (Apr. 6, 2019), XP051701664, 5 pages, Retrieved from the Internet: URL: http://www.3gpp.org/ftp/Meetings%5F3GPP%5FSYNC/RAN2/Docs/R2%2D1904359%2Ezip [retrieved on Apr. 6, 2019], chapter 2.1 DC base HO, figures 1, 2.

(Continued)

*Primary Examiner* — Afshawn M Towfighi
(74) *Attorney, Agent, or Firm* — Holland & Hart LLP/Qualcomm

(57) ABSTRACT

Methods, systems, and devices for wireless communications are described for a handover procedure that allows a user equipment (UE) to keep both the source and the target base station until after handover is complete while using a single packet data convergence protocol (PDCP). In the procedure, a source base station may decide to configure bearers as split bearers during handover. Then, the source base station may transmit a handover request to the target base station, and the radio bearer configuration is added to the handover preparation and response messages. The target base station may transmit the decision on the proposed configuration in a handover response message to the source base station. The source base station may transmit a handover command to the UE with the radio bearer configuration, and the UE may configure its bearers and will maintain the split bearer (Continued)

configuration until the UE receives a new bearer configuration.

30 Claims, 19 Drawing Sheets

(51) Int. Cl.
  *H04W 72/14* (2009.01)
  *H04W 80/08* (2009.01)
  *H04W 84/20* (2009.01)
(52) U.S. Cl.
  CPC ........... *H04W 76/27* (2018.02); *H04W 80/08* (2013.01); *H04W 84/20* (2013.01)
(58) Field of Classification Search
  CPC ............. H04W 84/20; H04W 36/0069; H04W 36/0011; H04W 36/0055
  See application file for complete search history.

(56) References Cited

U.S. PATENT DOCUMENTS

| | | | | |
|---|---|---|---|---|
| 2017/0086254 | A1* | 3/2017 | Lee | H04W 72/0413 |
| 2019/0327607 | A1* | 10/2019 | Xiao | H04W 76/15 |
| 2020/0113012 | A1 | 4/2020 | Lee et al. | |

OTHER PUBLICATIONS

International Search Report and Written Opinion—PCT/US2020/027277—ISA/EPO—dated Jul. 1, 2020.

Nokia, et al., "Report from [104#61] [LTE/feMOB] Solution Directions for Minimizing User Data Interruption for UL/DL (Nokia)", 3GPP Draft, 3GPP TSG-RAN WG2 Meeting #105, R2-1900619 Report From [104#61] [LTEFEMOB] Solution Directions for Minimizing User Data Interruption, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 13, 2019 (Feb. 13, 2019), XP051597319, 49 pages, Retrieved from the Internet: URL: http://www.3gpp.org/ftp/tsg%5Fran/WG2%5FRL2/TSGR2%5F105/Docs/R2%2D1900619%2Ezip [retrieved on Feb. 13, 2019] 2.1 Split bearer Solutions 1.1-1.5.

Vivo: "CP Signalling and Procedure of DC Handover," 3GPP Draft, 3GPP TSG-RAN WG2 Meeting #104, R2-1816331 CP Signalling and Procedure of DC Handover, 3rd Generation Partnership Project (3GPP), Mobile Competence Centre, 650, Route Des Lucioles, F-06921, Sophia-Antipolis Cedex, France, vol. RAN WG2, No. Spokane, USA; Nov. 12, 2018-Nov. 16, 2018, Nov. 12, 2018 (Nov. 12, 2018), XP051555922, 3 pages, Retrieved from the Internet: URL: http://www.3gpp.org/ftp/Meetings%5F3GPP%5FSYNC/RAN2/Docs/R2%2D1816331%2Ezip [retrieved on Nov. 12, 2018], chapter 2.1, chapter 2.2, figure 1,2, Proposal 2, 4, 5.

Vivo: "Up Architecture and Impacts of DC Handover," 3GPP Draft, 3GPP TSG-RAN WG2 Meeting #104, R2-1816332, Up Architecture and Impacts of Split Bearer Handover, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051555923, 4 pages, Retrieved from the Internet:URL: http://www.3gpp.org/ftp/Meetings%5F3GPP%5FSYNC/RAN2/Docs/R2%2D1816332%2Ezip [retrieved on Nov. 12, 2018], 1. Introduction, 2.1 Step 1: Addition of the target leg, figure 1.

\* cited by examiner

COMMUNICATIONS DURING HANDOVER PROCEDURE

CROSS REFERENCE

The present application for patent claims the benefit of U.S. Provisional Patent Application No. 62/836,589 by OZTURK et al., entitled "COMMUNICATIONS DURING HANDOVER PROCEDURE," filed Apr. 19, 2019, assigned to the assignee hereof, and expressly incorporated by reference herein.

BACKGROUND

The following relates generally to wireless communications, and more specifically to handover procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may support communications with a source base station and a target base station during a handover procedure from the source base station to the target base station. During the handover procedure, however, the UE may not be able to employ full transmission and reception capabilities during the time of transition from the source base station to the target base station. Some techniques may allow a UE to maintain communication links with both the source base station and the target base station until after handover is complete, and then the UE may decide when to release the communication link(s) (e.g., cease communicating with) the source base station. These techniques, however, may lead to increased system overhead due to additional coordination (e.g., protocol coordination) between the source base station and the target base station, and may result in additional power consumption at a UE. Other techniques may involve dual connectivity (DC), which may not be supported by all UEs in the network.

SUMMARY

The described techniques relate to improved methods, systems, devices, and apparatuses that support communications during handover procedure. Generally, the described techniques provide for a handover procedure that may allow a user equipment (UE), whether capable of dual connectivity (DC) or otherwise, to maintain communications with both a source base station and a target base station during a handover procedure through the use of a single packet data convergence protocol (PDCP) anchored at one of the source base station or the target base station. Using a single PDCP in accordance with techniques described herein may reduce handover latency and overhead (such as the overhead caused by the protocol coordination between the source and target base station) while allowing the UE to maintain uplink or downlink communications with the network through one or both of the source base station and the target base station.

The described techniques may involve a source base station that determines a split bearer configuration for radio bearers to be configured as split bearers during the handover procedure. Initially, a source base station in communication with a UE may determine to perform handover of the UE from the source base station to a target base station in accordance with a handover procedure. The handover procedure may involve the source base station sending a handover request in preparation for handover of the UE to the target base station. The handover request may identify or include a set of radio bearers that the source base station identifies as radio bearers to potentially be configured as split radio bearers during the handover procedure. Split radio bearers may be split at the PDCP layer of the source base station (e.g., anchored at the source base station) such that the layers below the PDCP layer are used at the target base station. In other cases, the PDCP layer may be split at the target base station (e.g., anchored at the target base station) such that the layers below the PDCP layer are used at the source base station. The use of split bearers may allow for data streams (e.g., uplink or downlink communications) to be between the UE and both the source and target base stations during the handover procedure.

The target base station may receive the handover request with the proposed radio bearer configuration indicating a set of radio bearers for splitting during handover preparation, and the target base station may fully accept, partially accept, or reject the proposed radio bearer configuration. The target base station may then transmit the decision on the proposed configuration in a handover response message to the source base station, which may indicate one or more of the set of radio bearers that the target base station accepts to be configured as split radio bearers.

Once a radio bearer configuration is agreed to by the source and target base stations, both base stations will configure respective radio bearers according to the agreed upon split bearer configuration. The source base station may then transmit a handover command to the UE indicating the split radio bearer configuration to be used for handover, and the UE may configure its bearers as split bearers based on the split radio bearer configuration. The UE may receive and/or transmit data streams according to the split bearer configuration during the handover procedure, and in some cases, will maintain the split radio bearer configuration until the UE receives a new bearer configuration (e.g., from the source or target base station).

In some examples, when handover is successful, the target base station may indicate (e.g., via a radio resource control (RRC) reconfiguration or grant) that the UE may drop the source base station radio bearers or reconfigure the radio bearers associated with the source base station radio bearers (e.g., dedicated source base station radio bearers or the split bearers configured for communications with the source base station) to target base station radio bearers. In cases where handover is unsuccessful, the source base station may indicate (e.g., via RRC reconfiguration or grant) that the UE may drop the target base station radio bearers or reconfigure the target base station radio bearers to source base station radio bearers.

A method of wireless communications at a UE is described. The method may include receiving, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configuring the set of radio bearers for communications associated with the handover procedure in accordance with the split radio bearer configuration, and communicating with the source base station, the target base station, or both via the set of radio bearers during the handover procedure.

An apparatus for wireless communications at a UE is described. The apparatus may include a processor, memory in electronic communication with the processor, and instructions stored in the memory. The instructions may be executable by the processor to cause the apparatus to receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configure the set of radio bearers for communications associated with the handover procedure in accordance with the split radio bearer configuration, and communicate with the source base station, the target base station, or both via the set of radio bearers during the handover procedure.

Another apparatus for wireless communications at a UE is described. The apparatus may include means for receiving, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configuring the set of radio bearers for communications associated with the handover procedure in accordance with the split radio bearer configuration, and communicating with the source base station, the target base station, or both via the set of radio bearers during the handover procedure.

A non-transitory computer-readable medium storing code for wireless communications at a UE is described. The code may include instructions executable by a processor to receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configure the set of radio bearers for communications associated with the handover procedure in accordance with the split radio bearer configuration, and communicate with the source base station, the target base station, or both via the set of radio bearers during the handover procedure.

In some examples of the method, apparatuses, and non-transitory computer-readable medium described herein, communicating may include operations, features, means, or instructions for transmitting a first set of data to the source base station via a first radio bearer configured for uplink communications with the source base station during the handover procedure, and transmitting a second set of data to the target base station via a second radio bearer configured for uplink communications with the target base station during the handover procedure.

In some examples of the method, apparatuses, and non-transitory computer-readable medium described herein, communicating may include operations, features, means, or instructions for receiving a first set of data from the source base station via a first radio bearer configured for downlink communications with the source base station during the handover procedure, and receiving a second set of data from the target base station via a second radio bearer configured for downlink communications with the target base station during the handover procedure.

In some examples of the method, apparatuses, and non-transitory computer-readable medium described herein, configuring may include operations, features, means, or instructions for configuring a first downlink radio bearer for communications with the source base station during the handover procedure in accordance with the split radio bearer configuration; configuring a second downlink radio bearer for communications with the target base station during the handover procedure in accordance with the split radio bearer configuration; and configuring an uplink radio bearer for communications with the target base station during the handover procedure in accordance with a source to target switch configuration.

Some examples of the method, apparatuses, and non-transitory computer-readable medium described herein may further include operations, features, means, or instructions for receiving a reconfiguration message from the target base station, the reconfiguration message indicating a reconfiguration of at least one radio bearer of the set of radio bearers for communications with the target base station, and configuring the at least one radio bearer for communications with the target base station based on the reconfiguration message.

Some examples of the method, apparatuses, and non-transitory computer-readable medium described herein may further include operations, features, means, or instructions for receiving a reconfiguration message from the target base station, the reconfiguration message indicating a reconfiguration of the radio bearers for communications with the target base station, configuring the radio bearers for communications with the target base station based on the reconfiguration message, and dropping each radio bearer of the set of radio bearers configured for communications with the source base station based on the reconfiguration message.

Some examples of the method, apparatuses, and non-transitory computer-readable medium described herein may further include operations, features, means, or instructions for switching communications from the source base station to the target base station in accordance with the handover procedure, transmitting a handover complete message to the target base station based on the switching, and dropping each radio bearer of the set of radio bearers configured for communications with the source base station based on the handover complete message.

Some examples of the method, apparatuses, and non-transitory computer-readable medium described herein may further include operations, features, means, or instructions for receiving, from the target base station, a grant for a data communication associated with the target base station, and dropping each radio bearer of the set of radio bearers configured for communications with the source base station based on the grant.

Some examples of the method, apparatuses, and non-transitory computer-readable medium described herein may further include operations, features, means, or instructions for receiving a reconfiguration message from the source base station based on a failure of the handover procedure, the reconfiguration message indicating a reconfiguration of at least one radio bearer of the set of radio bearers for communications with the source base station, and configuring the at least one radio bearer for communications with the source base station based on the reconfiguration message.

Some examples of the method, apparatuses, and non-transitory computer-readable medium described herein may further include operations, features, means, or instructions for transmitting a message to the source base station indicating the failure of the handover procedure, where the reconfiguration message may be received from the source base station in response to the message.

In some examples of the method, apparatuses, and non-transitory computer-readable medium described herein, configuring the set of radio bearers may include operations, features, means, or instructions for configuring a first radio bearer for communications with the source base station during the handover procedure, and configuring a second radio bearer for communications with the target base station during the handover procedure.

Some examples of the method, apparatuses, and non-transitory computer-readable medium described herein may further include operations, features, means, or instructions for receiving the handover command from the source base station via an RRC message.

In some examples of the method, apparatuses, and non-transitory computer-readable medium described herein, the handover command may be generated at the target base station.

In some examples of the method, apparatuses, and non-transitory computer-readable medium described herein, the set of radio bearers may be associated with low latency communications.

A method of wireless communications at a source base station is described. The method may include identifying a UE for handover from the source base station to a target base station via a handover procedure, identifying a set of radio bearers for configuring as split radio bearers for the handover procedure, transmitting a handover request to the target base station requesting configuration of the set of radio bearers as split radio bearers, receiving, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicating with the UE via at least one radio bearer of the subset of the radio bearers during the handover procedure.

An apparatus for wireless communications at a source base station is described. The apparatus may include a processor, memory in electronic communication with the processor, and instructions stored in the memory. The instructions may be executable by the processor to cause the apparatus to identify a UE for handover from the source base station to a target base station via a handover procedure, identify a set of radio bearers for configuring as split radio bearers for the handover procedure, transmit a handover request to the target base station requesting configuration of the set of radio bearers as split radio bearers, receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicate with the UE via at least one radio bearer of the subset of the radio bearers during the handover procedure.

Another apparatus for wireless communications at a source base station is described. The apparatus may include means for identifying a UE for handover from the source base station to a target base station via a handover procedure, identifying a set of radio bearers for configuring as split radio bearers for the handover procedure, transmitting a handover request to the target base station requesting configuration of the set of radio bearers as split radio bearers, receiving, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicating with the UE via at least one radio bearer of the subset of the radio bearers during the handover procedure.

A non-transitory computer-readable medium storing code for wireless communications at a source base station is described. The code may include instructions executable by a processor to identify a UE for handover from the source base station to a target base station via a handover procedure, identify a set of radio bearers for configuring as split radio bearers for the handover procedure, transmit a handover request to the target base station requesting configuration of the set of radio bearers as split radio bearers, receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicate with the UE via at least one radio bearer of the subset of the radio bearers during the handover procedure.

Some examples of the method, apparatuses, and non-transitory computer-readable medium described herein may further include operations, features, means, or instructions for receiving a data packet from the UE via a radio bearer configured for uplink communications between the source base station and the UE, and transmitting, to the target base station, a message that includes a PDCP protocol data unit (PDU) associated with the data packet.

Some examples of the method, apparatuses, and non-transitory computer-readable medium described herein may further include operations, features, means, or instructions for receiving a first data packet from the UE via a radio bearer configured for uplink communications between the source base station and the UE, receiving, from the target base station, a PDCP PDU associated with a second data packet of the UE, and transmitting, to a core network node, a message that includes a PDCP service data unit (SDU) including the first data packet and the PDCP PDU associated with the second data packet of the UE.

Some examples of the method, apparatuses, and non-transitory computer-readable medium described herein may further include operations, features, means, or instructions for receiving, from the target base station, a PDCP PDU associated with a data packet of the UE, and transmitting, to the UE, a message that includes the PDCP PDU associated with the data packet via a radio bearer configured for downlink communications between the source base station and the UE.

Some examples of the method, apparatuses, and non-transitory computer-readable medium described herein may further include operations, features, means, or instructions for receiving, at a PDCP layer of the source base station, a PDCP SDU associated with a set of data for the UE, transmitting, to the target base station, a first PDCP PDU including a first subset of the data for the UE, and transmitting, to the UE via a radio bearer configured for downlink communications between the source base station and the UE, a message that includes a second PDCP PDU including a second subset of the data for the UE.

Some examples of the method, apparatuses, and non-transitory computer-readable medium described herein may further include operations, features, means, or instructions for configuring at least one radio bearer of the subset of the set of radio bearers for communications with the source base station based on the response to the handover request.

Some examples of the method, apparatuses, and non-transitory computer-readable medium described herein may further include operations, features, means, or instructions for transmitting, to the UE, a handover command for handover of the UE from the source base station to the target base station, the handover command indicating a split radio bearer configuration for the at least one radio bearer.

Some examples of the method, apparatuses, and non-transitory computer-readable medium described herein may further include operations, features, means, or instructions for transmitting, to the UE, a handover command for handover of the UE from the source base station to the target base station, the handover command indicating a split radio bearer configuration for at least one downlink radio bearer and a source to target switch configuration for an uplink bearer.

Some examples of the method, apparatuses, and non-transitory computer-readable medium described herein may further include operations, features, means, or instructions for configuring a master cell group radio bearer for communications associated with the handover procedure, and communicating with the UE via the master cell group radio bearer.

Some examples of the method, apparatuses, and non-transitory computer-readable medium described herein may further include operations, features, means, or instructions for transmitting a reconfiguration message to the UE based on a failure of the handover procedure, the reconfiguration message indicating a reconfiguration of the subset of radio bearers for communications with the source base station.

Some examples of the method, apparatuses, and non-transitory computer-readable medium described herein may further include operations, features, means, or instructions for receiving a message from the UE or target base station indicating the failure of the handover procedure, where the reconfiguration message may be transmitted to the UE in response to the message.

Some examples of the method, apparatuses, and non-transitory computer-readable medium described herein may further include operations, features, means, or instructions for dropping each radio bearer of the subset of radio bearers configured for communications between the source base station and the UE based on a completion of the handover procedure.

In some examples of the method, apparatuses, and non-transitory computer-readable medium described herein, the set of radio bearers identified for configuring as split radio bearers may be associated with low latency communications.

A method of wireless communications at a target base station is described. The method may include receiving, from a source base station, a handover request for handover of a UE from the source base station to the target base station in accordance with a handover procedure, the handover request requesting configuration of a set of radio bearers as split radio bearers for the handover procedure, determining one or more radio bearers of the set of radio bearers for configuration as split radio bearers for the handover procedure, transmitting a response to the handover request to the source base station, where the response indicates the one or more radio bearers for configuration as split radio bearers for the handover procedure, the split radio bearers being used to communicate data streams during the handover procedure between the UE and both the source base station and the target base station, and communicating with the UE via the one or more radio bearers during the handover procedure.

An apparatus for wireless communications at a target base station is described. The apparatus may include a processor, memory in electronic communication with the processor, and instructions stored in the memory. The instructions may be executable by the processor to cause the apparatus to receive, from a source base station, a handover request for handover of a UE from the source base station to the target base station in accordance with a handover procedure, the handover request requesting configuration of a set of radio bearers as split radio bearers for the handover procedure, determine one or more radio bearers of the set of radio bearers for configuration as split radio bearers for the handover procedure, transmit a response to the handover request to the source base station, where the response indicates the one or more radio bearers for configuration as split radio bearers for the handover procedure, the split radio bearers being used to communicate data streams during the handover procedure between the UE and both the source base station and the target base station, and communicate with the UE via the one or more radio bearers during the handover procedure.

Another apparatus for wireless communications at a target base station is described. The apparatus may include means for receiving, from a source base station, a handover request for handover of a UE from the source base station to the target base station in accordance with a handover procedure, the handover request requesting configuration of a set of radio bearers as split radio bearers for the handover procedure, determining one or more radio bearers of the set of radio bearers for configuration as split radio bearers for the handover procedure, transmitting a response to the handover request to the source base station, where the response indicates the one or more radio bearers for configuration as split radio bearers for the handover procedure, the split radio bearers being used to communicate data streams during the handover procedure between the UE and both the source base station and the target base station, and communicating with the UE via the one or more radio bearers during the handover procedure.

A non-transitory computer-readable medium storing code for wireless communications at a target base station is described. The code may include instructions executable by a processor to receive, from a source base station, a handover request for handover of a UE from the source base station to the target base station in accordance with a handover procedure, the handover request requesting configuration of a set of radio bearers as split radio bearers for the handover procedure, determine one or more radio bearers of the set of radio bearers for configuration as split radio bearers for the handover procedure, transmit a response to the handover request to the source base station, where the response indicates the one or more radio bearers for configuration as split radio bearers for the handover procedure, the split radio bearers being used to communicate data streams during the handover procedure between the UE and both the source base station and the target base station, and communicate with the UE via the one or more radio bearers during the handover procedure.

Some examples of the method, apparatuses, and non-transitory computer-readable medium described herein may further include operations, features, means, or instructions for receiving a first data packet from the UE via a radio bearer configured for uplink communications between the target base station and the UE, receiving, from the source base station, a message that includes a PDCP PDU associated with a second data packet of the UE, and transmitting, to a core network node, a message that includes a PDCP SDU including the first data packet and the PDCP PDU associated with the second data packet of the UE.

Some examples of the method, apparatuses, and non-transitory computer-readable medium described herein may further include operations, features, means, or instructions for receiving a data packet from the UE via a radio bearer configured for uplink communications between the target base station and the UE, and transmitting, to the source base station, a PDCP PDU associated with the data packet of the UE.

Some examples of the method, apparatuses, and non-transitory computer-readable medium described herein may further include operations, features, means, or instructions for receiving, at a PDCP layer of the target base station, a PDCP SDU associated with a set of data for the UE, transmitting, to the source base station, a PDCP PDU including a first subset of the data for the UE, and transmitting, to the UE via a radio bearer configured for downlink communications between the target base station and the UE, a message that includes a second PDCP PDU including a second subset of the data for the UE.

Some examples of the method, apparatuses, and non-transitory computer-readable medium described herein may further include operations, features, means, or instructions for receiving, from the target base station, a PDCP PDU associated with a data packet of the UE, and transmitting, to the UE, a message that includes the PDCP PDU associated with the data packet via a radio bearer configured for downlink communications between the target base station and the UE.

Some examples of the method, apparatuses, and non-transitory computer-readable medium described herein may further include operations, features, means, or instructions for configuring at least one radio bearer of the subset of the set of radio bearers for communications between the UE and the target base station based on the response to the handover request.

Some examples of the method, apparatuses, and non-transitory computer-readable medium described herein may further include operations, features, means, or instructions for configuring a secondary cell group radio bearer for communications associated with the handover procedure, and communicating with the UE via the secondary cell group bearer.

Some examples of the method, apparatuses, and non-transitory computer-readable medium described herein may further include operations, features, means, or instructions for receiving a handover complete message from the UE based on a completion of the handover procedure, and transmitting a reconfiguration message to the UE based on the handover complete message, the reconfiguration message indicating a reconfiguration of at least one radio bearer of the set of radio bearers for communications with the target base station.

Some examples of the method, apparatuses, and non-transitory computer-readable medium described herein may further include operations, features, means, or instructions for transmitting, to the UE, a grant for a data communication between the UE and the target base station based on a completion of the handover procedure, and communicating with the UE based on the grant.

Some examples of the method, apparatuses, and non-transitory computer-readable medium described herein may further include operations, features, means, or instructions for generating a handover command for the UE based on the handover request from the source base station, and transmitting an indication of the handover command to the source base station.

Some examples of the method, apparatuses, and non-transitory computer-readable medium described herein may further include operations, features, means, or instructions for transmitting a message to the source base station indicating a failure of the handover procedure based on an incomplete handover procedure after a given time duration.

DETAILED DESCRIPTION

Figure 1:
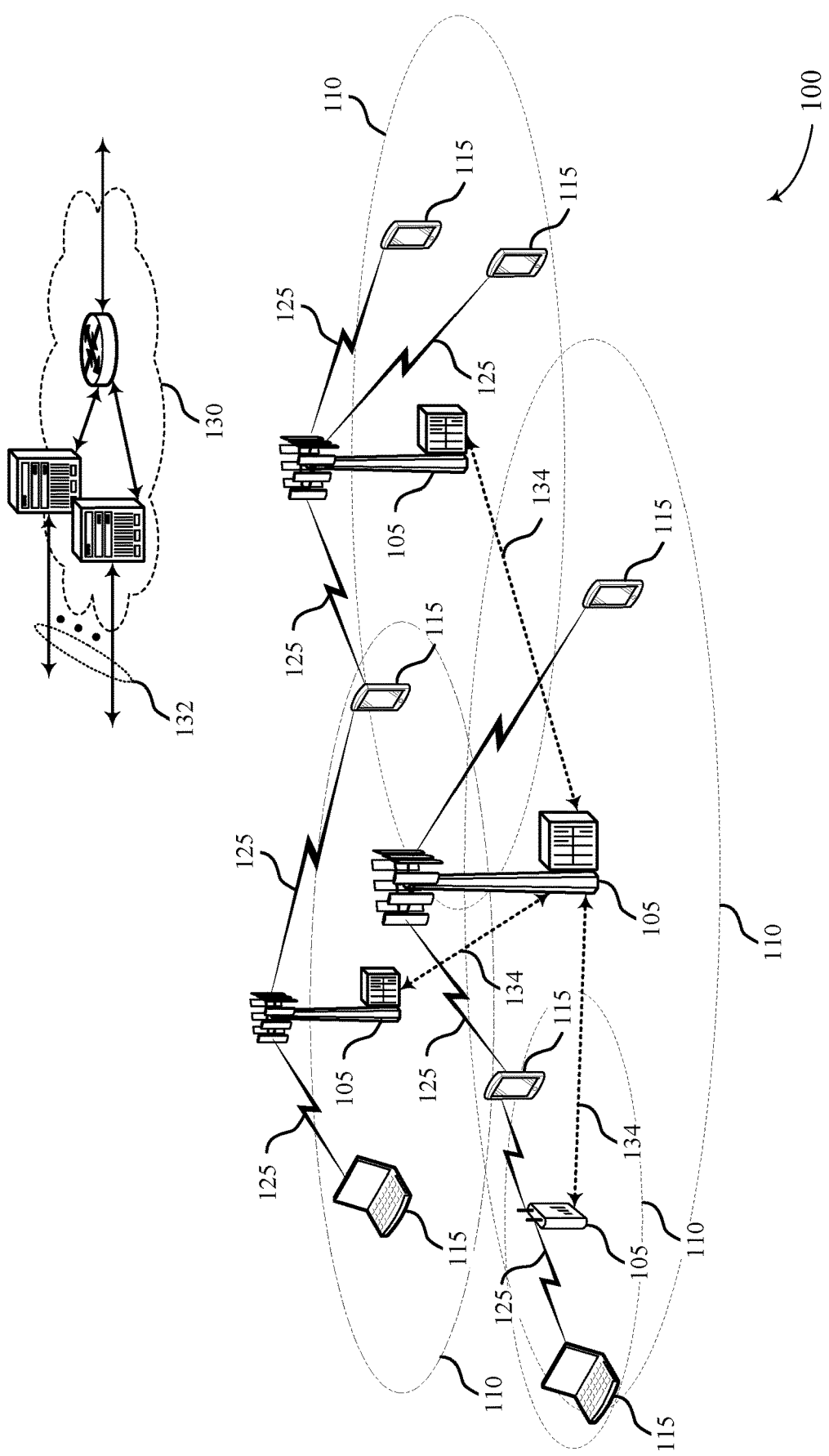
FIG. 1 through 3 illustrate examples of a wireless communications system that supports communications during handover procedure in accordance with aspects of the present disclosure.

In some cases, a user equipment (UE) may support simultaneous or concurrent (e.g., continuous or ongoing) communications with a source base station and a target base station during handover. During the handover procedure, the UE may be connected to both the source base station and the target base station, and the UE may not be able to employ full transmission and reception capabilities during the transition time from the source base station to the target base station. Some techniques may allow a UE may to keep both the source base station and the target base station connections until after handover is complete, and then the UE may decide whether to release connectivity with the source base station. Alternative techniques may include using a dual connectivity (DC) enabled UE configured for communications with a target base station acting as a secondary node in addition to an established source base station acting as the master node in a DC mode. The role of secondary node and master node may be switched by the UE, such that the target base station becomes the master node (e.g., after a successful handover). These techniques, however, may result in increased overhead (e.g., due to protocol coordination between the source base station and the target base station) or may be limited to only those UEs having certain capabilities (e.g., UEs that support DC).

According to techniques described herein, a UE (e.g., whether capable of DC) may to keep both the source base station and the target base station until after handover is complete while using a single packet data convergence protocol (PDCP) to reduce handover latency and overhead (e.g., caused by source and target base station protocol coordination). The procedure may include a source base station deciding which radio bearers to configure as split bearers during handover. For example, the configuration may be based on which radio bearers may use a 0 millisecond (ms) or reduced latency handover, or other quality of service (QoS) or latency standard. A split bearer configuration may be used for uplink, downlink, or both. If a bearer is not configured to be split for handover, the bearer may follow a "hard" switch handover where the transmission may only be to or from one base station, and a PDCP re-establishment occurs, which may also be referred to as a source to target switch. For example, the uplink bearer may follow a hard switch handover, and the downlink bearer may follow a split bearer configuration for handover.

The handover procedure may continue with the source base station sending a handover request to the target base station requesting that a set of radio bearers be configured as split radio bearers. In some cases, the PDCP layer operations may be performed at the source base station (e.g., anchored at the source base station) and only the layers below the PDCP layer are performed at the target base station, which may be referred to as master node terminated. In other cases, the PDCP layer operations may be performed at the target base station (e.g., anchored at the target base station) and only the layers below the PDCP layer are performed at the source base station, which may be referred to as secondary node terminated.

In some examples, radio bearer configuration is added to the handover preparation and response messages to negotiate and configure the radio bearer(s) as split bearers. For instance, a target base station may receive the handover request with the proposed radio bearer configuration during handover preparation, and the target base station may fully accept, partially accept, or reject the proposed radio bearer configuration. The target base station may then transmit the decision on the proposed configuration in a handover response message to the source base station. In some cases, the source base station may transmit a new radio bearer configuration proposal to the target base station based on the received previous decision from the target base station.

Once a radio bearer configuration is agreed to by the source and target base stations, both base stations will configure their respective bearers based on the agreed split bearer configuration. The source base station may then transmit a handover command to the UE with the radio bearer configuration to be used for handover. The handover command may include a radio resource control (RRC) reconfiguration message, and the handover command may be generated by the target base station. Based on the handover command, the UE may configure its bearers (e.g., as split bearers) based on the radio bearer configuration. The UE may receive and/or transmit data streams according to the split bearer configuration during the handover procedure. Further, the UE will maintain the split bearer configuration until the UE receives a new bearer configuration from a base station.

In some examples, when the handover is successful, the target base station may indicate (e.g., via RRC reconfiguration or grant) that the UE may drop the source base station radio bearers or reconfigure the source base station radio bearers to target base station radio bearers. If the UE transmits a handover completion message, the UE may drop or reconfigure the source base station radio bearers after transmitting the handover completion message. In cases when the handover is unsuccessful, the source base station may indicate (e.g., via RRC reconfiguration or grant) that the UE may drop the target base station radio bearers or reconfigure the target base station radio bearers to source base station radio bearers. In some cases, the UE or target base station may indicate to the source base station that the handover was unsuccessful.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to communications during handover procedure.

FIG. 1 illustrates an example of a wireless communications system 100 that supports communications during handover procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support simultaneous, concurrent, or ongoing communications during handover of a UE 115 from a base station 105 (e.g., a source base station) to another base station 105 (e.g., a target base station) in accordance with a handover procedure. The handover procedure may utilize a split bearer configuration where one or more radio bearers are configured as split radio bearers for the handover procedure. The split bearers may allow data streams to be communicated (e.g., uplink data streams or downlink data streams) between the UE 115 and both the source base station 105 and the target base station 105. After completion of the handover procedure, the radio bearers may be reconfigured or dropped by the UE 115 depending on whether the handover procedure was successful.

Figure 2:
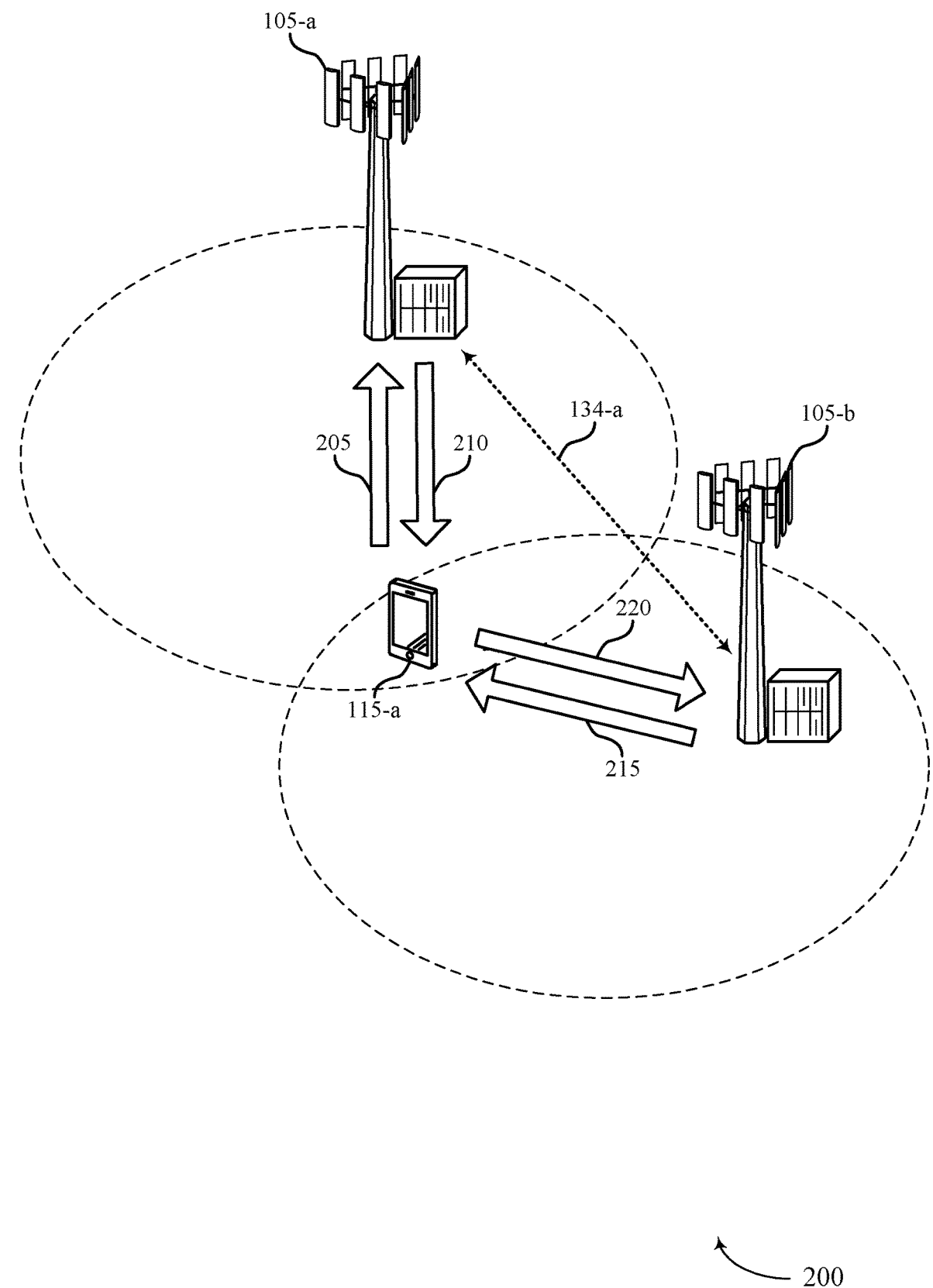

FIG. 2 illustrates an example of a wireless communications system 200 that supports communications during handover procedure in accordance with aspects of the present disclosure. In some examples, wireless communications system 200 may implement aspects of wireless communications system 100. For example, wireless communications system 200 includes source base station 105-a, target base station 105-b, and UE 115-a, which may be examples of the corresponding devices described with reference to FIG. 1.

Wireless communications system 200 may support split bearer configuration during a handover procedure independent of the capabilities of UE 115-a. In this example, one of source base station 105-a and target base station 105-b may provide a master cell group (MCG) radio bearer, and the other base station 105-a or 105-b may provide a secondary cell group (SCG) radio bearer. For example, source base station 105-a may configure an MCG radio bearer for communications with UE 115-a and target base station 105-b may configured an SCG radio bearer for communications with the UE 115-a. In some cases, UE 115-a may be DC capable, but in other cases, UE 115-a may not support DC.

In wireless communications system 200, source base station 105-a and target base station 105-b may perform a handover procedure that may allow UE 115-a (e.g., whether or not DC capable) to maintain communication with both source base station 105-a and target base station 105-b until after handover is complete while using a single PDCP layer (e.g., source base station 105-a and target base station 105-b perform protocol coordination) independent of UE DC capability. For example, in wireless communications system 200, UE 115-a may perform a handover and be connected to source base station 105-a (e.g., UE 115-a may communicate via data streams 205 and 210 with source base station 105-a) while also being connected to target base station 105-b (e.g., UE 115-a may communicate via data streams 205 and 210 with source base station 105-a).

In some cases, source base station 105-a may determine that UE 115-a is to perform a handover procedure to target base station 105-b. In some cases, source base station 105-a may make this determination based on signaling received from UE 115-a, for example, based on one or more signal measurements associated with a target cell served by target base station 105-b. The handover procedure may include source base station 105-a deciding which radio bearers to configure as split bearers during handover. For example, the configuration may be based on which radio bearers may use a 0 ms or reduced latency handover, or other QoS or latency standard. A split bearer configuration may be used for uplink, downlink, or both. Split bearer may refer to when a radio bearer is divided at the PDCP layer such that one PDCP layer may be split for use at the layers below the PDCP layer. In such cases, a data stream (e.g., data streams 205, 210, 215, and 220) may be communicated between the UE 115-a and both the source base station 105-a and the target base station 105-b. For example, according to a split bearer configuration for uplink, uplink communications may be sent from the UE 115-a to the source base station 105-a via data stream 205 and to the target base station 105-b via data stream 220. For downlink communications, a UE 115-a may receive a data stream 210 from the source base station 105-a and a data stream 215 from the target base station 105-b. Data streams 205, 210, 215, and 220 may be associated with one or more split radio bearers and may contain the same or different data. If a bearer is not configured to be split for handover, the bearer may follow a "hard" switch handover where the transmission can only be to or from one base station, and a PDCP re-establishment occurs. For example, the uplink bearer may follow a hard switch handover where uplink communications may be sent from the UE 115-a to the source base station 105-a via data stream 205 before handover and to the target base station 105-b via data stream 220 after handover, and the downlink bearer may follow a split bearer configuration for handover such that the UE 115-a may receive a data stream 210 from the source base station 105-a and a data stream 215 from the target base station 105-b during handover.

The handover procedure may continue with source base station 105-a sending a handover request in handover preparation to target base station 105-b via backhaul link 134-a to configure these bearers as split. In some cases, the PDCP layer may be at source base station 105-a (e.g., anchored) and only the layers below the PDCP layer may be performed at target base station 105-b, which may be referred to as master node terminated. In other cases, the PDCP layer may performed be at target base station 105-b (e.g., anchored) and only the layers below the PDCP layer may be performed at source base station 105-a, which may be referred to as secondary node terminated.

In some examples, radio bearer configuration is part of the handover preparation (e.g., the radio bearer configuration may be included in a handover request) and response messages to negotiate and configure the radio bearer(s) as split bearers. For instance, target base station 105-b may receive the handover request via backhaul link 134-a with the proposed radio bearer configuration during handover preparation, and target base station 105-b may fully accept, partially accept, or reject the proposed radio bearer configuration. Target base station 105-b may then transmit the decision on the proposed configuration in a handover response message to source base station 105-a via backhaul link 134-a. Source base station 105-a may transmit a new radio bearer configuration proposal to target base station 105-b via backhaul link 134-a based on the received previous decision from target base station 105-b.

Once a radio bearer configuration is agreed to by source base station 105-a and target base station 105-b, both base stations 105 may configure their bearers according to the agreement. Source base station 105-a may then transmit a handover command to UE 115-a with the radio bearer configuration to be used for handover. The handover command may include an RRC reconfiguration message, and the handover command may be generated by target base station 105-b. Based on the handover command, UE 115-a may configure its bearers as split bearers based on the radio bearer configuration received. UE 115-a may receive and/or transmit data streams according to the split bearer configuration during the handover procedure. Further, UE 115-a may maintain the split bearer configuration until UE 115-a receives a new bearer configuration from a base station 105. In some examples, UE 115-a may be configured with one or more bearers that are not split bearers (e.g., a radio bearer may be configured for the source base station 105-a or the target base station 105-b, a radio bearer may be configured for uplink communications, downlink communications, or both). UE 115-*a* may therefore be configured with one or more split bearers and one or more other bearers.

In some examples, when handover is successful, target base station 105-*b* may indicate (e.g., via RRC reconfiguration or grant) that UE 115-*a* may drop source base station 105-*a* radio bearers or reconfigure source base station 105-*a* radio bearers to target base station 105-*b* radio bearers. If UE 115-*a* transmits a handover completion message, UE 115-*a* may drop or reconfigure source base station 105-*a* radio bearers after transmitting the handover completion message. If handover is unsuccessful, however, source base station 105-*a* may indicate (e.g., via RRC reconfiguration or grant) that UE 115-*a* may drop target base station 105-*b* radio bearers or reconfigure target base station 105-*b* radio bearers to source base station 105-*a* radio bearers. In some cases, UE 115-*a* or target base station 105-*b* may indicate to source base station 105-*a* that the handover was unsuccessful. For example, an indication of the failure to complete handover may be sent by UE 115-*a* to source base station 105-*a*, which may allow source base station 105-*a* to send the aforementioned reconfiguration message to UE 115-*a*. Another alternative is for the target base station 105-*b* to send a failure indication to source base station 105-*a* via backhaul link 134-*a* if UE 115-*a* does not complete handover in a given time.

Figure 3:
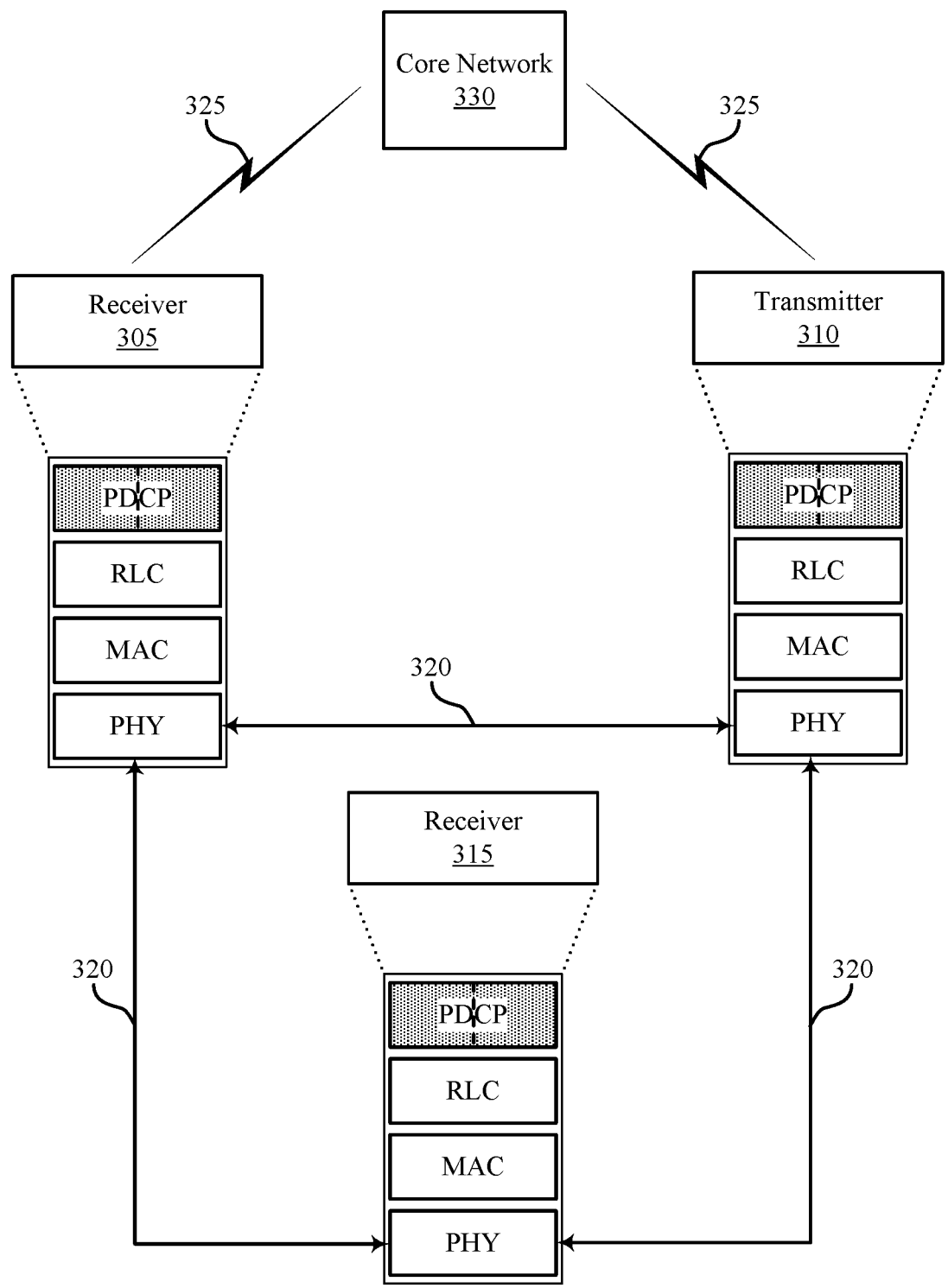

FIG. 3 illustrates an example of a wireless communications system 300 that supports communications during handover procedure in accordance with aspects of the present disclosure. In some examples, wireless communications system 300 may implement aspects of wireless communications systems 100 or 200. Wireless communications system 300 may include first receiver 305, second receiver 315, and transmitter 310. First receiver 305, second receiver 315, and transmitter 310 may support split bearer communications, as shown by the shaded split PDCP at each device.

In wireless communications system 300, one or both of the first receiver 305 and transmitter 310 may be connected to the core network 330 via links 325. In the split PDCP layer of transmitter 310, information to be transmitted may go through a buffer that assigns sequence numbering to the information. Then, the information may undergo header compression and may have a PDCP header added. After the PDCP header is added to the information, the information is split and routed to the first receiver 305 and the second receiver 315 via the radio interface 320. In the split PDCP layer of first receiver 305 and second receiver 315, the information may be received over radio interface 320 from two devices (e.g., transmitter 310 and first receiver 305 or second receiver 315). The information received over split bearers may be handled at a single PDCP at the first receiver 305 or second receiver 315. In some cases, split bearers may be configured for uplink, downlink, or both.

Transmitter 310 may be a source base station and may be connected to the core network 330. Transmitter 310 may be configured to use split bearer(s) for downlink. For example, if information is received at transmitter 310 from the core network 330, then the information (e.g., data stream) may be split and routed to the target base station (e.g., first receiver 305). The data stream may then be transmitted to a UE (e.g., second receiver 315) using a single PDCP via both the source base station (e.g., transmitter 310) and the target base station (e.g., first receiver 305). In this example, first receiver 305 may not be connected to the core network 330.

Transmitter 310 may be a target base station and may be connected to the core network 330. Transmitter 310 may be configured to use split bearer(s) for downlink. For example, if information is received at transmitter 310 from the core network 330, then the information (e.g., data stream) may be split and routed to the source base station (e.g., first receiver 305). The data stream may then be transmitted to a UE (e.g., second receiver 315) using a single PDCP via both the target base station (e.g., transmitter 310) and the source base station (e.g., first receiver 305). In this example, first receiver 305 may not be connected to the core network 330.

Transmitter 310 may be a UE and may not be connected to the core network 330. The UE may be capable of split bearer communication during uplink. First receiver 305 may be a base station (e.g., source or target) that may be connected to the core network 330. Second receiver 315 may also be a base station (e.g., source or target) that may not be connected to the core network 330. In this example, first receiver 305 may be connected to the core network 330.

Figure 4:
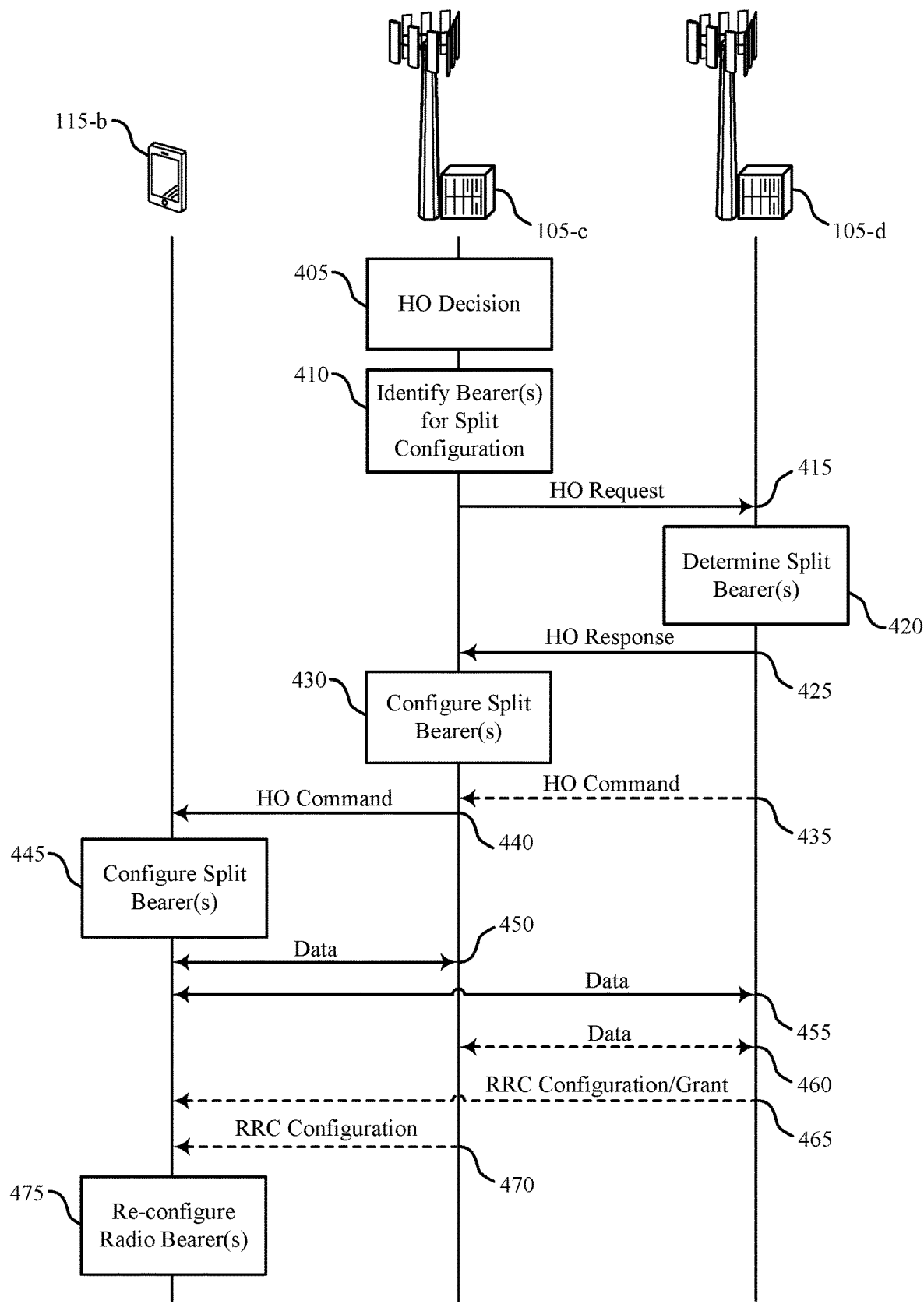
FIG. 4 illustrates an example of a process flow that supports communications during handover procedure in accordance with aspects of the present disclosure.

FIG. 4 illustrates an example of a process flow 400 that supports communications during handover procedure in accordance with aspects of the present disclosure. In some examples, process flow 400 may implement aspects of wireless communications systems 100, 200, or 300. Process flow 400 may include UE 115-*b*, source base station 105-*c*, and target base station 105-*d*, which may be examples of the corresponding devices described with reference to FIGS. 1 through 3.

At 405, source base station 105-*c* may determine a handover procedure for UE 115-*b* should be performed with target base station 105-*d*. For example, the determination may be based on measurement reports received from UE 115-*b*.

At 410, source base station 105-*c* may identify bearer(s) for a split bearer configuration to be used by source base station 105-*c* and target base station 105-*d* for the handover procedure to allow simultaneous communication between UE 115-*b*, source base station 105-*c*, and target base station 105-*d* during handover using a single PDCP.

At 415, source base station 105-*c* may transmit a handover request to target base station 105-*d*. The handover request may include a request for the identified split bearer configuration.

At 420, target base station 105-*d* may determine which split bearer(s) to use for the handover procedure based on the handover request received at 415. For example, target base station 105-*d* may agree with the indicated split bearer configuration, may partially accept the indicated split bearer configuration, or may negotiate the indicated split bearer configuration with source base station 105-*c*. After the split bearer configuration is agreed upon, target base station 105-*d* may configure a subset of its radio bearers as split bearers. Non-split bearers may be configured for a source to target switch at handover.

At 425, target base station 105-*d* may transmit a response to the handover request to source base station 105-*c* for the handover of UE 115-*b*. The response may indicate the one or more radio bearers for split radio bearer configuration for the handover procedure. The split radio bearers may be used to communicate data streams during the handover procedure between UE 115-*b*, source base station 105-*c*, and/or target base station 105-*d*. In some cases, the response may include an indication of a handover command to be transmitted from source base station 105-*c* to UE 115-*b* at 440.

At 430, source base station 105-*c* may configure at least one radio bearer as split bearer for communications with target base station 105-*d* and UE 115-*b* based at least in part on the response to the handover request.

At 435, target base station 105-*d* may optionally transmit an indication of a handover command to be transmitted from source base station 105-*c* to UE 115-*b* at 440.

At 440, source base station 105-c may transmit, to UE 115-b, a handover command for handover of UE 115-b from source base station 105-c to target base station 105-d, the handover command indicating a split radio bearer configuration for at least one radio bearer. In some examples, the split radio bearer configuration may identify a set of radio bearers whose data streams during the handover procedure are between UE 115-b, source base station 105-c, and target base station 105-d.

At 445, UE 115-b may configure one or more radio bearers as split bearers for communications accompanying the handover procedure based on the handover command received at 440.

At 450, UE 115-b and source base station 105-c may communicate (e.g., transmit and/or receive) a set of data with source base station 105-c via a radio bearer configured for communications (e.g., uplink and/or downlink) with source base station 105-c during the handover procedure.

At 455, UE 115-b and target base station 105-d may communicate (e.g., transmit and/or receive) another set of data to target base station 105-d via a different radio bearer than used at 450, which is configured for uplink and/or downlink communications with target base station 105-d during the handover procedure. In some cases, data transmission 455 may occur contemporaneously with data transmission 450.

At 460, source base station 105-c and target base station 105-d may optionally exchange data. For instance, a message that includes a PDCP PDU associated with the data packet may be received at target base station 105-d during data transmission 455. If the PDCP layer is not at target base station 105-d (e.g., source base station 105-c is the anchor), then target base station 105-d may transmit the PDCP PDU to source base station 105-c. In another example, a message that includes a PDCP PDU associated with the data packet may be received at source base station 105-c during data transmission 450. If the PDCP layer is not at source base station 105-c (e.g., target base station 105-d is the anchor), then source base station 105-c may transmit the PDCP PDU to target base station 105-d. This data exchange 460 may allow PDCP PDUs received during a split bearer configuration to reach the core network.

At 465, target base station 105-d may optionally transmit an RRC configuration or grant to UE 115-b. The RRC configuration may include a reconfiguration message from target base station 105-d, and the reconfiguration message may include a reconfiguration of at least one radio bearer for communications with target base station 105-d.

At 470, if handover fails, source base station 105-c may optionally transmit an RRC configuration to UE 115-b. The RRC configuration may include a reconfiguration message from source base station 105-c, and the reconfiguration message may indicate a reconfiguration of at least one radio bearer for communications with source base station 105-c. In some cases, UE 115-b or target base station 105-d may indicate to source base station 105-c that the handover was unsuccessful. For example, an indication of the failure to complete handover may be sent by UE 115-b to source base station 105-c, which may allow source base station 105-c to send the aforementioned reconfiguration message to UE 115-b at 470. Another alternative is for the target base station 105-d to send a failure indication to source base station 105-c if UE 115-b does not complete handover in a given time.

At 475, UE 115-b may reconfigure its radio bearers for future communications with source base station 105-c, target base station 105-d, or both. For example, if handover was successful, UE 115-b may receive an indication from target base station 105-d to reconfigure the source bearers as target bearers or to drop each radio bearer of the subset of radio bearers configured for communications between source base station 105-c and UE 115-b. If a radio bearer was configured as target base station 105-d bearer, dropping the source base station 105-c may autonomous at UE 115-b and may also be based on other events, such as handover completion or reception of a grant from target base station 105-d. In some cases, UE 115-b may transmit an indication of successful handover to source base station 105-c, target base station 105-d, or both.

In another example, if handover was unsuccessful, UE 115-b may receive an indication from source base station 105-c to reconfigure the target bearers as source bearers or to drop each radio bearer of the subset of radio bearers configured for communications between target base station 105-d and UE 115-b. This example may apply when the source base station 105-c is the anchor.

Figure 5:
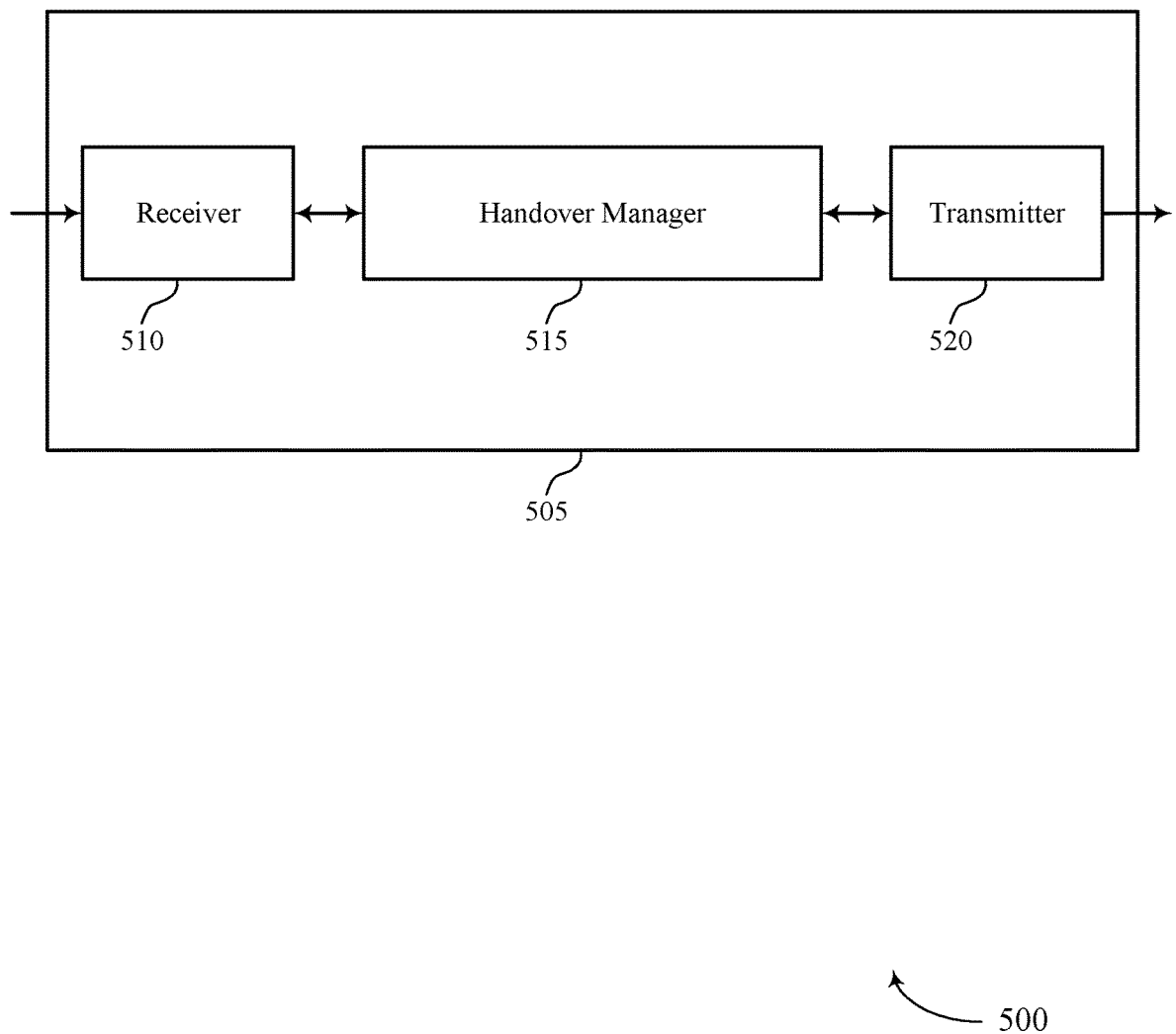
FIGS. 5 and 6 show block diagrams of devices that support communications during handover procedure in accordance with aspects of the present disclosure.

FIG. 5 shows a block diagram 500 of a device 505 that supports communications during handover procedure in accordance with aspects of the present disclosure. The device 505 may be an example of aspects of a UE 115 as described herein. The device 505 may include a receiver 510, a handover manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to communications during handover procedure, etc.). Information may be passed on to other components of the device 505. The receiver 510 may be an example of aspects of the transceiver 820 described with reference to FIG. 8. The receiver 510 may utilize a single antenna or a set of antennas.

The handover manager 515 may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configure the set of radio bearers for communications associated with the handover procedure in accordance with the split radio bearer configuration, and communicate with the source base station, the target base station, or both via the set of radio bearers during the handover procedure. The handover manager 515 may be an example of aspects of the handover manager 810 described herein.

The handover manager 515, or its sub-components, may be implemented in hardware, code (e.g., software or firmware) executed by a processor, or any combination thereof. If implemented in code executed by a processor, the functions of the handover manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The handover manager 515, or its sub-components, may be physically located at various positions, including being distributed such that portions of functions are implemented at different physical locations by one or more physical components. In some examples, the handover manager 515, or its sub-components, may be a separate and distinct component in accordance with various aspects of the present disclosure. In some examples, the handover manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the handover manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The handover manager 515 as described herein may be implemented to realize one or more potential advantages. One implementation may allow the device 505 to perform efficient handover operations (e.g., for low latency communications) between the device 505 and a base station. Based on the techniques for a handover using a split bearer configuration between the device 505 and the base station, the device 505 may support a more optimized handover procedure, therefore, errors and latency may be reduced between communications during handover procedures. As such, the device 505 may communicate over the channel with a greater likelihood of successful communications. In some examples, based on a greater likelihood of successful communications, the device 505 may more efficiently power a processor or one or more processing units associated with handover procedures and transmitting and receiving communications, which may enable the device to save power and increase battery life.

Figure 6:
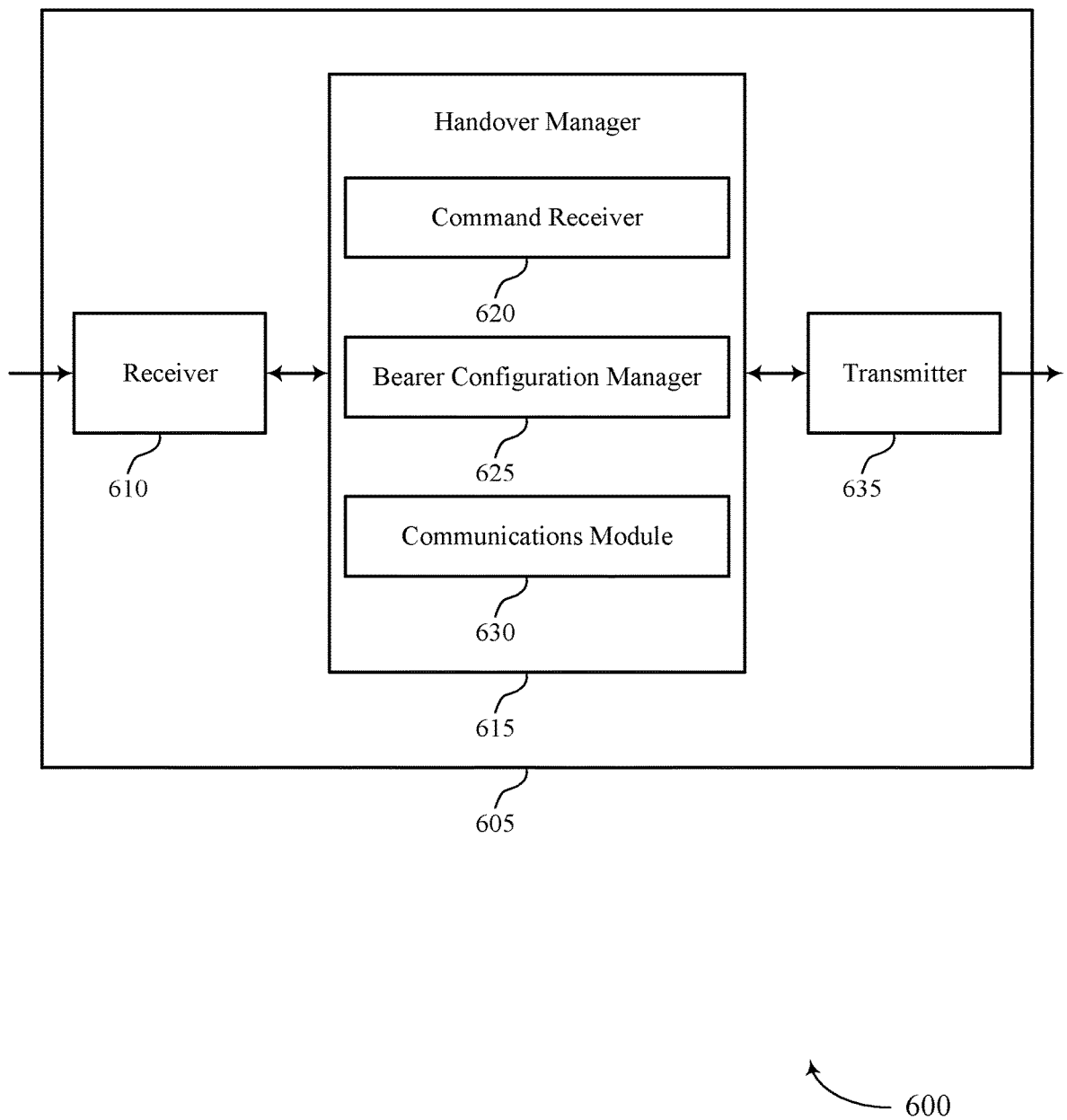

FIG. 6 shows a block diagram 600 of a device 605 that supports communications during handover procedure in accordance with aspects of the present disclosure. The device 605 may be an example of aspects of a device 505, or a UE 115 as described herein. The device 605 may include a receiver 610, a handover manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to communications during handover procedure, etc.). Information may be passed on to other components of the device 605. The receiver 610 may be an example of aspects of the transceiver 820 described with reference to FIG. 8. The receiver 610 may utilize a single antenna or a set of antennas.

The handover manager 615 may be an example of aspects of the handover manager 515 as described herein. The handover manager 615 may include a command receiver 620, a bearer configuration manager 625, and a communications module 630. The handover manager 615 may be an example of aspects of the handover manager 810 described herein.

The command receiver 620 may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station.

The bearer configuration manager 625 may configure the set of radio bearers for communications associated with the handover procedure in accordance with the split radio bearer configuration.

The communications module 630 may communicate with the source base station, the target base station, or both via the set of radio bearers during the handover procedure.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
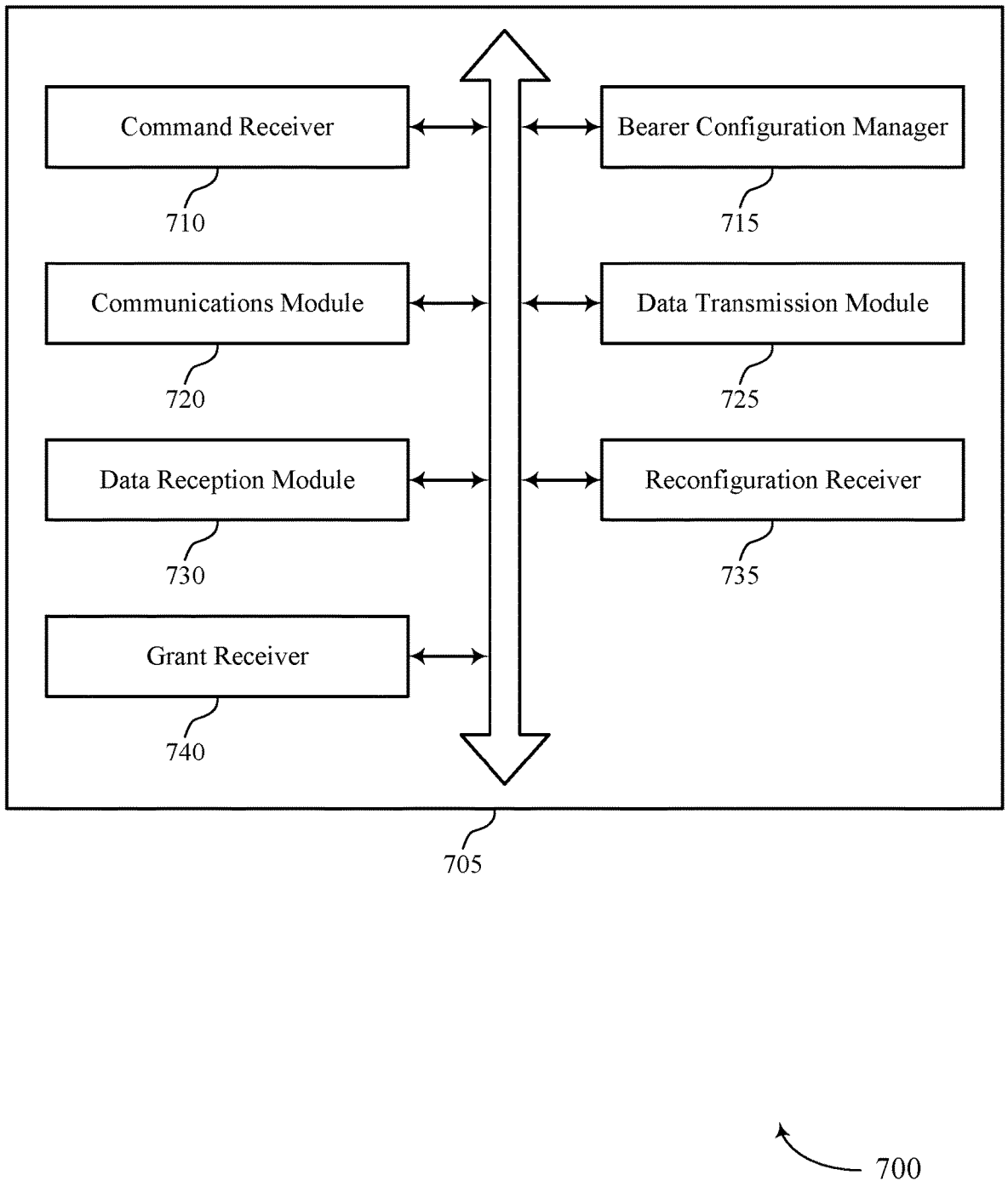
FIG. 7 shows a block diagram of a handover manager that supports communications during handover procedure in accordance with aspects of the present disclosure.

FIG. 7 shows a block diagram 700 of a handover manager 705 that supports communications during handover procedure in accordance with aspects of the present disclosure. The handover manager 705 may be an example of aspects of a handover manager 515, a handover manager 615, or a handover manager 810 described herein. The handover manager 705 may include a command receiver 710, a bearer configuration manager 715, a communications module 720, a data transmission module 725, a data reception module 730, a reconfiguration receiver 735, and a grant receiver 740. Each of these modules may communicate, directly or indirectly, with one another (e.g., via one or more buses).

The command receiver 710 may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. In some examples, the command receiver 710 may receive the handover command from the source base station via an RRC message. In some cases, the handover command is generated at the target base station.

The bearer configuration manager 715 may configure the set of radio bearers for communications associated with the handover procedure in accordance with the split radio bearer configuration. In some examples, the bearer configuration manager 715 may configure the at least one radio bearer for communications with the target base station based on the reconfiguration message. In some cases, the bearer configuration manager 715 may drop each radio bearer of the set of radio bearers configured for communications with the source base station based on the handover complete message, the grant, or the reconfiguration message. In some aspects, the bearer configuration manager 715 may configure the at least one radio bearer for communications with the source base station based on the reconfiguration message.

In some examples, the bearer configuration manager 715 may configure a first radio bearer for communications with the source base station during the handover procedure. In some aspects, the bearer configuration manager 715 may configure a second radio bearer for communications with the target base station during the handover procedure. In some cases, the set of radio bearers are associated with low latency communications. In some examples, the bearer configuration manager 715 may configure a first downlink radio bearer for communications with the source base station during the handover procedure in accordance with the split radio bearer configuration. The bearer configuration manager 715 may configure a second downlink radio bearer for communications with the target base station during the handover procedure in accordance with the split radio bearer configuration. The bearer configuration manager 715 may configure an uplink radio bearer for communications with the target base station during the handover procedure in accordance with a source to target switch configuration.

The communications module 720 may communicate with the source base station, the target base station, or both via the set of radio bearers during the handover procedure. In some examples, the communications module 720 may switch communications from the source base station to the target base station in accordance with the handover procedure. In some cases, the communications module 720 may transmit a handover complete message to the target base station based on the switching. In some aspects, the communications module 720 may transmit a message to the source base station indicating the failure of the handover procedure, where the reconfiguration message is received from the source base station in response to the message.

The data transmission module 725 may transmit a first set of data to the source base station via a first radio bearer configured for uplink communications with the source base station during the handover procedure. In some examples, the data transmission module 725 may transmit a second set of data to the target base station via a second radio bearer configured for uplink communications with the target base station during the handover procedure.

The data reception module 730 may receive a first set of data from the source base station via a first radio bearer configured for downlink communications with the source base station during the handover procedure. In some examples, the data reception module 730 may receive a second set of data from the target base station via a second radio bearer configured for downlink communications with the target base station during the handover procedure.

The reconfiguration receiver 735 may receive a reconfiguration message from the target base station, the reconfiguration message indicating a reconfiguration of at least one radio bearer of the set of radio bearers for communications with the target base station. In some examples, the reconfiguration receiver 735 may receive a reconfiguration message from the source base station based on a failure of the handover procedure, the reconfiguration message indicating a reconfiguration of at least one radio bearer of the set of radio bearers for communications with the source base station. In some cases, the reconfiguration receiver 735 may receive a reconfiguration message from the target base station, the reconfiguration message indicating a bearer reconfiguration for the UE.

The grant receiver 740 may receive, from the target base station, a grant for a data communication associated with the target base station.

Figure 8:
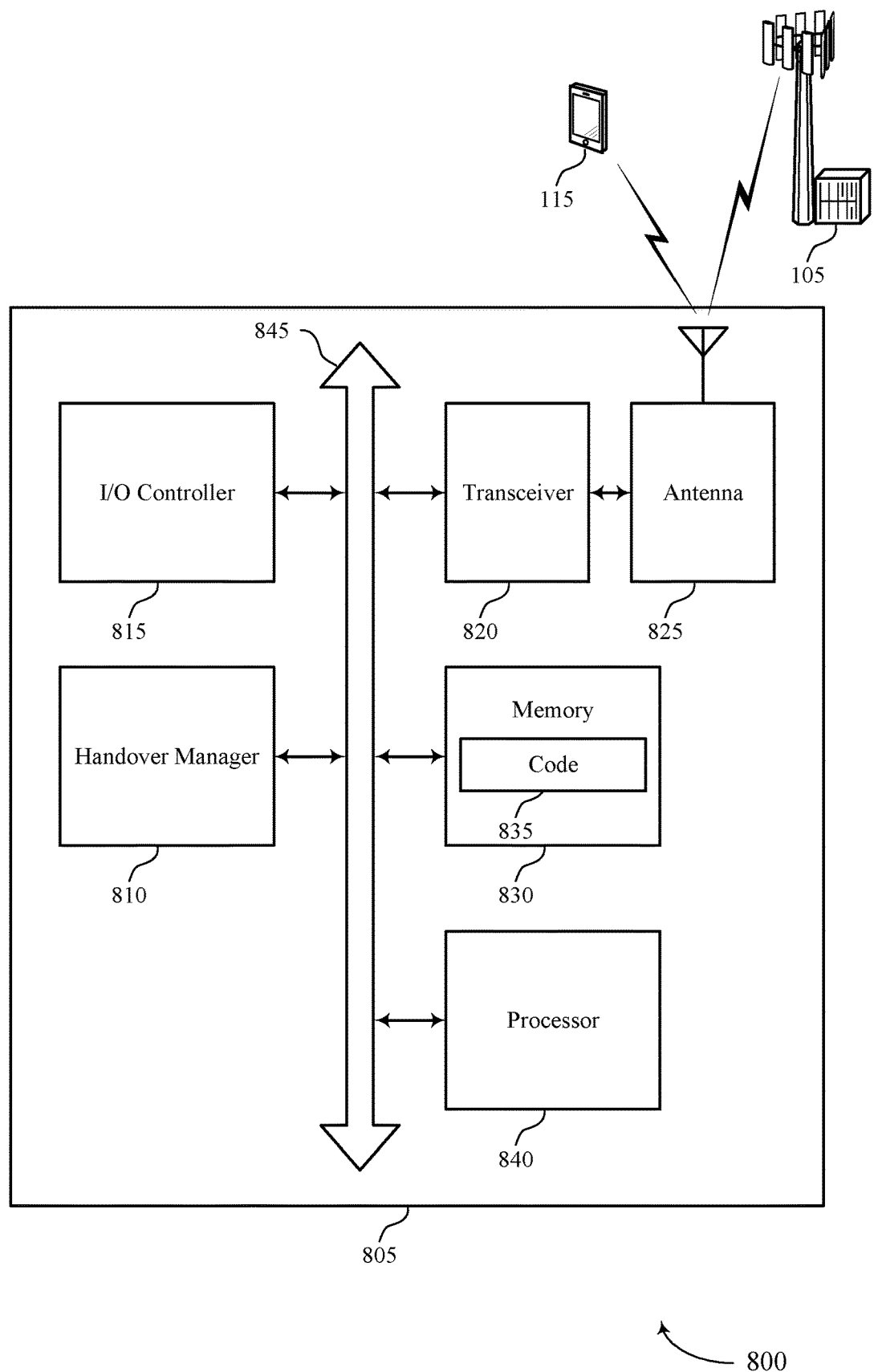
FIG. 8 shows a diagram of a system including a device that supports communications during handover procedure in accordance with aspects of the present disclosure.

FIG. 8 shows a diagram of a system 800 including a device 805 that supports communications during handover procedure in accordance with aspects of the present disclosure. The device 805 may be an example of or include the components of device 505, device 605, or a UE 115 as described herein. The device 805 may include components for bi-directional voice and data communications including components for transmitting and receiving communications, including a handover manager 810, an I/O controller 815, a transceiver 820, an antenna 825, memory 830, and a processor 840. These components may be in electronic communication via one or more buses (e.g., bus 845).

The handover manager 810 may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station, configure the set of radio bearers for communications associated with the handover procedure in accordance with the split radio bearer configuration, and communicate with the source base station, the target base station, or both via the set of radio bearers during the handover procedure.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825, or the device 805 may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting communications during handover procedure).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
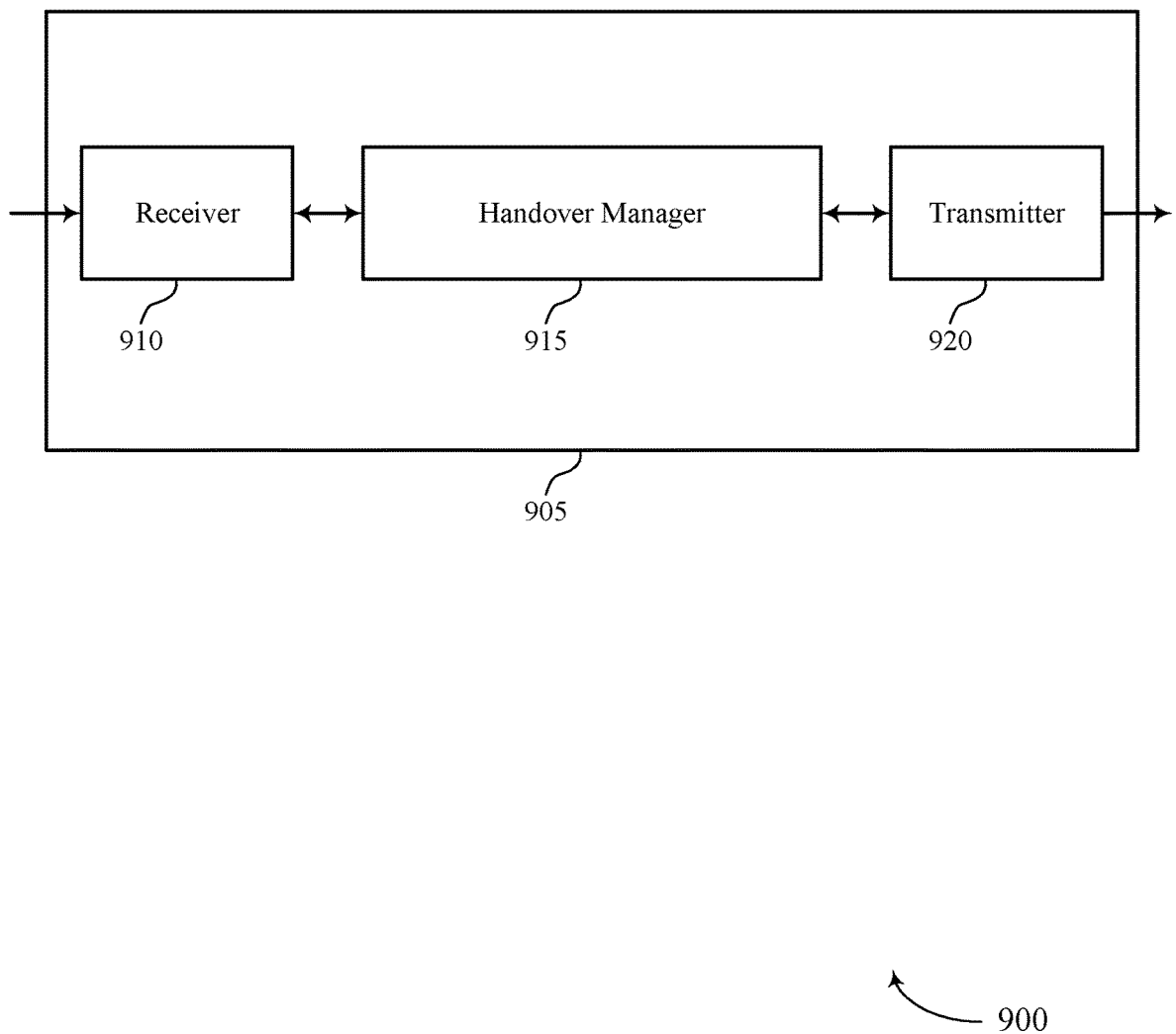
FIGS. 9 and 10 show block diagrams of devices that support communications during handover procedure in accordance with aspects of the present disclosure.

FIG. 9 shows a block diagram 900 of a device 905 that supports communications during handover procedure in accordance with aspects of the present disclosure. The device 905 may be an example of aspects of a base station 105 (e.g., a target base station or a source base station) as described herein. The device 905 may include a receiver 910, a handover manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to communications during handover procedure, etc.). Information may be passed on to other components of the device 905. The receiver 910 may be an example of aspects of the transceiver 1220 described with reference to FIG. 12. The receiver 910 may utilize a single antenna or a set of antennas.

In some cases, for example when operating at a source base station, the handover manager 915 may identify a UE for handover from the source base station to a target base station via a handover procedure, identify a set of radio bearers for configuring as split radio bearers for the handover procedure, transmit a handover request to the target base station requesting configuration of the set of radio bearers as split radio bearers, receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicate with the UE via at least one radio bearer of the subset of the radio bearers during the handover procedure.

In some aspects, for example when operating at a target base station, the handover manager 915 may also receive, from a source base station, a handover request for handover of a UE from the source base station to the target base station in accordance with a handover procedure, the handover request requesting configuration of a set of radio bearers as split radio bearers for the handover procedure, determine one or more radio bearers of the set of radio bearers for configuration as split radio bearers for the handover procedure, transmit a response to the handover request to the source base station, where the response indicates the one or more radio bearers for configuration as split radio bearers for the handover procedure, the split radio bearers being used to communicate data streams during the handover procedure between the UE and both the source base station and the target base station, and communicate with the UE via the one or more radio bearers during the handover procedure. The handover manager 915 may be an example of aspects of the handover manager 1210 described herein.

The handover manager 915, or its sub-components, may be implemented in hardware, code (e.g., software or firmware) executed by a processor, or any combination thereof. If implemented in code executed by a processor, the functions of the handover manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The handover manager 915, or its sub-components, may be physically located at various positions, including being distributed such that portions of functions are implemented at different physical locations by one or more physical components. In some examples, the handover manager 915, or its sub-components, may be a separate and distinct component in accordance with various aspects of the present disclosure. In some examples, the handover manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
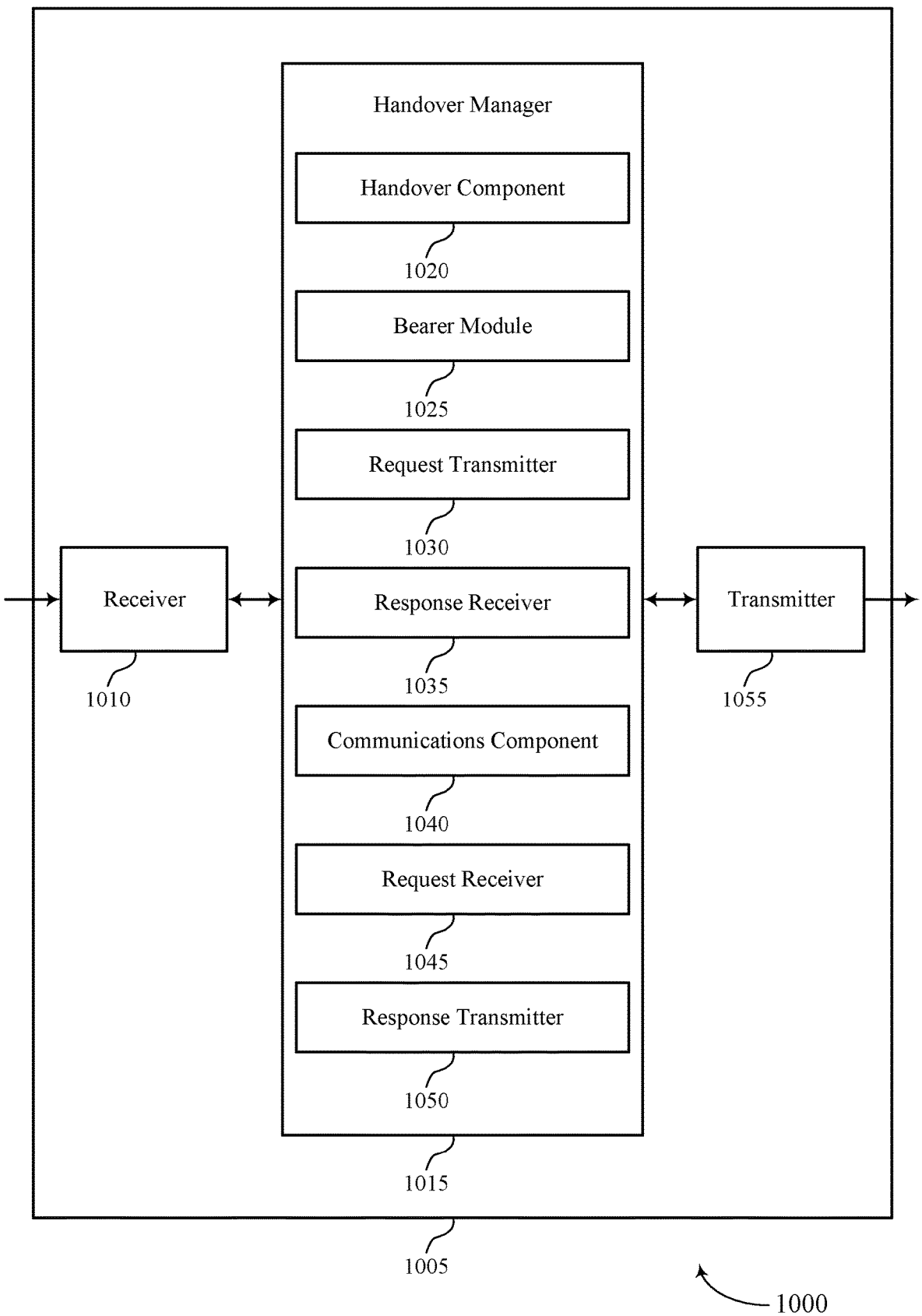

FIG. 10 shows a block diagram 1000 of a device 1005 that supports communications during handover procedure in accordance with aspects of the present disclosure. The device 1005 may be an example of aspects of a device 905, or a base station 105 as described herein. The device 1005 may include a receiver 1010, a handover manager 1015, and a transmitter 1055. The device 1005 may also include a processor. Each of these components may be in communication with one another (e.g., via one or more buses).

The receiver 1010 may receive information such as packets, user data, or control information associated with various information channels (e.g., control channels, data channels, and information related to communications during handover procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The handover manager 1015 may be an example of aspects of the handover manager 915 as described herein. The handover manager 1015 may include a handover component 1020, a bearer module 1025, a request transmitter 1030, a response receiver 1035, a communications component 1040, a request receiver 1045, and a response transmitter 1050. The handover manager 1015 may be an example of aspects of the handover manager 1210 described herein.

When operating at a source base station, the handover component 1020 may identify a UE for handover from the source base station to a target base station via a handover procedure. The bearer module 1025 may identify a set of radio bearers for configuring as split radio bearers for the handover procedure. The request transmitter 1030 may transmit a handover request to the target base station requesting configuration of the set of radio bearers as split radio bearers. The response receiver 1035 may receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station. The communications component 1040 may communicate with the UE via at least one radio bearer of the subset of the radio bearers during the handover procedure.

When operating at a target base station, the request receiver 1045 may receive, from a source base station, a handover request for handover of a UE from the source base station to the target base station in accordance with a handover procedure, the handover request requesting configuration of a set of radio bearers as split radio bearers for the handover procedure. The bearer module 1025 may determine one or more radio bearers of the set of radio bearers for configuration as split radio bearers for the handover procedure. The response transmitter 1050 may transmit a response to the handover request to the source base station, where the response indicates the one or more radio bearers for configuration as split radio bearers for the handover procedure, the split radio bearers being used to communicate data streams during the handover procedure between the UE and both the source base station and the target base station. The communications component 1040 may communicate with the UE via the one or more radio bearers during the handover procedure.

The transmitter 1055 may transmit signals generated by other components of the device 1005. In some examples, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

Figure 11:
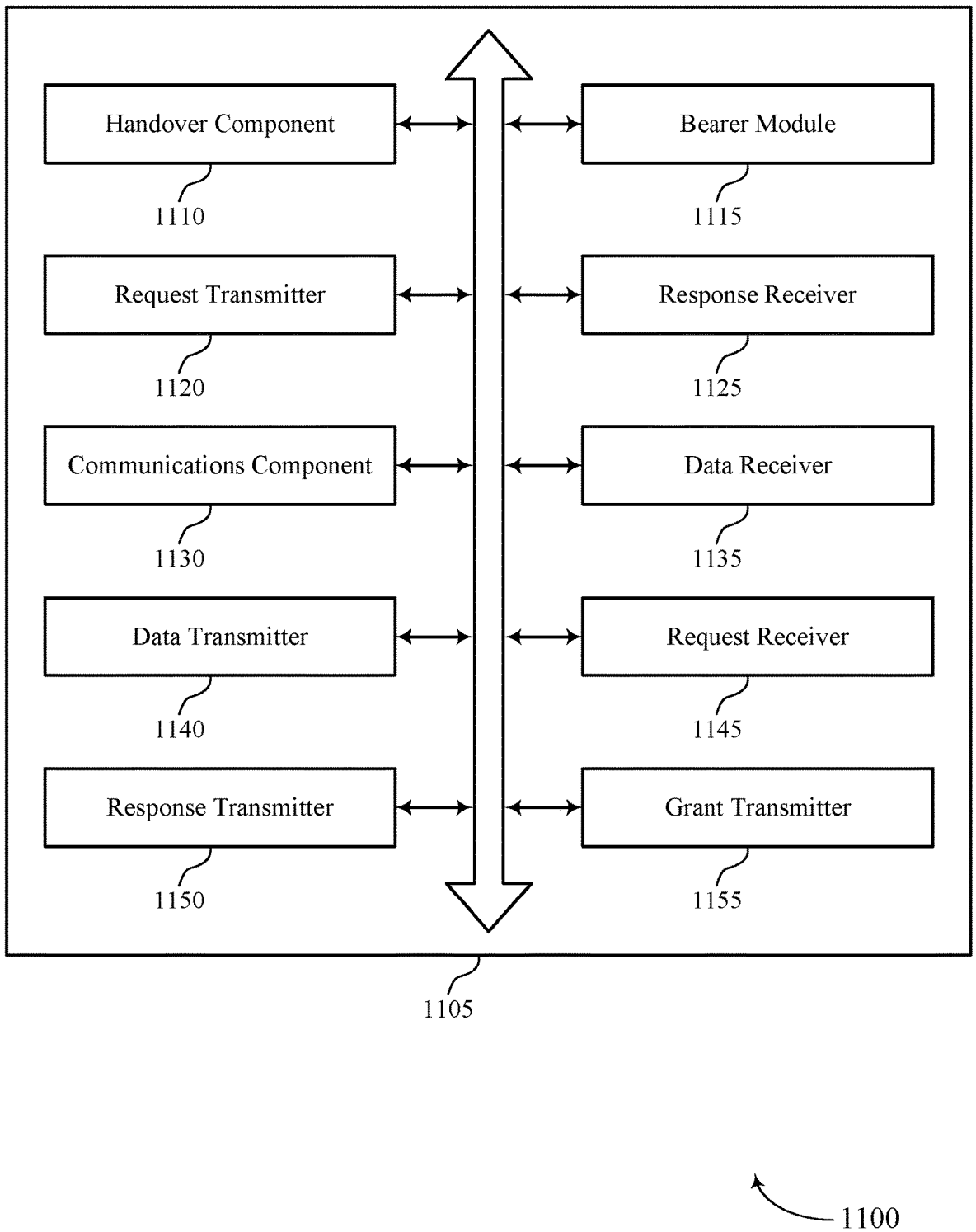
FIG. 11 shows a block diagram of a handover manager that supports communications during handover procedure in accordance with aspects of the present disclosure.

FIG. 11 shows a block diagram 1100 of a handover manager 1105 that supports communications during handover procedure in accordance with aspects of the present disclosure. The handover manager 1105 may be an example of aspects of a handover manager 915, a handover manager 1015, or a handover manager 1210 described herein. The handover manager 1105 may include a handover component 1110, a bearer module 1115, a request transmitter 1120, a response receiver 1125, a communications component 1130, a data receiver 1135, a data transmitter 1140, a request receiver 1145, a response transmitter 1150, and a grant transmitter 1155. Each of these modules may communicate, directly or indirectly, with one another (e.g., via one or more buses).

The handover component 1110 may identify a UE for handover from the source base station to a target base station via a handover procedure. In some examples, the handover component 1110 may transmit, to the UE, a handover command for handover of the UE from the source base station to the target base station, the handover command indicating a split radio bearer configuration for the at least one radio bearer. In some examples, the handover component 1110 may transmit, to the UE, a handover command for handover of the UE from the source base station to the target base station, the handover command indicating a split radio bearer configuration for at least one downlink radio bearer and a source to target switch configuration for an uplink bearer. In some cases, the handover component 1110 may transmit a reconfiguration message to the UE based on a failure of the handover procedure, the reconfiguration message indicating a reconfiguration of the subset of radio bearers for communications with the source base station. In some aspects, the handover component 1110 may receive a handover complete message from the UE based on a completion of the handover procedure. In some instances, the handover component 1110 may transmit a reconfiguration message to the UE based on the handover complete message, the reconfiguration message indicating a reconfiguration of at least one radio bearer of the set of radio bearers for communications with the target base station.

In some examples, the handover component 1110 may generate a handover command for the UE based on the handover request from the source base station. In some cases, the handover component 1110 may transmit an indication of the handover command to the source base station. In some aspects, the handover component 1110 may receive a message from the UE or target base station indicating the failure of the handover procedure, where the reconfiguration message is transmitted to the UE in response to the message. In some instances, the handover component 1110 may transmit a message to the source base station indicating a failure of the handover procedure based at least in part on an incomplete handover procedure after a given time duration.

The bearer module 1115 may identify a set of radio bearers for configuring as split radio bearers for the handover procedure. In some examples, the bearer module 1115 may determine one or more radio bearers of the set of radio bearers for configuration as split radio bearers for the handover procedure. In some cases, the bearer module 1115 may configure at least one radio bearer of the subset of the set of radio bearers for communications with the source base station based on the response to the handover request. In some aspects, the bearer module 1115 may configure a master cell group radio bearer for communications associated with the handover procedure. In some instances, the bearer module 1115 may drop each radio bearer of the subset of radio bearers configured for communications between the source base station and the UE based on a completion of the handover procedure.

In some examples, the bearer module 1115 may configure at least one radio bearer of the subset of the set of radio bearers for communications between the UE and the target base station based on the response to the handover request. In some aspects, the bearer module 1115 may configure a secondary cell group radio bearer for communications associated with the handover procedure. In some cases, the set of radio bearers identified for configuring as split radio bearers are associated with low latency communications.

The request transmitter 1120 may transmit a handover request to the target base station requesting configuration of the set of radio bearers as split radio bearers.

The response receiver 1125 may receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station.

The communications component 1130 may communicate with the UE via at least one radio bearer of the subset of the radio bearers during the handover procedure. In some examples, the communications component 1130 may communicate with the UE via the one or more radio bearers during the handover procedure. In some cases, the communications component 1130 may communicate with the UE via the master cell group radio bearer. In some aspects, the communications component 1130 may communicate with the UE via the secondary cell group bearer. In some instances, the communications component 1130 may communicate with the UE based on the grant.

The request receiver 1145 may receive, from a source base station, a handover request for handover of a UE from the source base station to the target base station in accordance with a handover procedure, the handover request requesting configuration of a set of radio bearers as split radio bearers for the handover procedure.

The response transmitter 1150 may transmit a response to the handover request to the source base station, where the response indicates the one or more radio bearers for configuration as split radio bearers for the handover procedure, the split radio bearers being used to communicate data streams during the handover procedure between the UE and both the source base station and the target base station.

The data receiver 1135 may receive a data packet from the UE via a radio bearer configured for uplink communications between the source base station and the UE. In some examples, the data receiver 1135 may receive a first data packet from the UE via a radio bearer configured for uplink communications between the source base station and the UE. In some cases, the data receiver 1135 may receive, from the target base station, a PDCP protocol data unit (PDU) associated with a second data packet of the UE. In some aspects, the data receiver 1135 may receive, from the target base station, a PDCP PDU associated with a data packet of the UE. In some instances, the data receiver 1135 may receive, at a PDCP layer of the source base station, a PDCP service data unit (SDU) associated with a set of data for the UE.

In some examples, the data receiver 1135 may receive a first data packet from the UE via a radio bearer configured for uplink communications between the target base station and the UE. In some cases, the data receiver 1135 may receive, from the source base station, a message that includes a PDCP PDU associated with a second data packet of the UE. In some aspects, the data receiver 1135 may receive a data packet from the UE via a radio bearer configured for uplink communications between the target base station and the UE. In some instances, the data receiver 1135 may receive, at a PDCP layer of the target base station, a PDCP SDU associated with a set of data for the UE. In some examples, the data receiver 1135 may receive, from the target base station, a PDCP PDU associated with a data packet of the UE.

The data transmitter 1140 may transmit, to the target base station, a message that includes a PDCP PDU associated with the data packet. In some examples, the data transmitter 1140 may transmit, to a core network node, a message that includes a PDCP SDU including the first data packet and the PDCP PDU associated with the second data packet of the UE. In some cases, the data transmitter 1140 may transmit, to the UE, a message that includes the PDCP PDU associated with the data packet via a radio bearer configured for downlink communications between the source base station and the UE. In some aspects, the data transmitter 1140 may transmit, to the target base station, a first PDCP PDU including a first subset of the data for the UE. In some instances, the data transmitter 1140 may transmit, to the UE via a radio bearer configured for downlink communications between the source base station and the UE, a message that includes a second PDCP PDU including a second subset of the data for the UE.

In some examples, the data transmitter 1140 may transmit, to a core network node, a message that includes a PDCP SDU including the first data packet and the PDCP PDU associated with the second data packet of the UE. In some cases, the data transmitter 1140 may transmit, to the source base station, a PDCP PDU associated with the data packet of the UE. In some aspects, the data transmitter 1140 may transmit, to the source base station, a PDCP PDU including a first subset of the data for the UE. In some instances, the data transmitter 1140 may transmit, to the UE via a radio bearer configured for downlink communications between the target base station and the UE, a message that includes a second PDCP PDU including a second subset of the data for the UE. In some examples, the data transmitter 1140 may transmit, to the UE, a message that includes the PDCP PDU associated with the data packet via a radio bearer configured for downlink communications between the target base station and the UE.

The grant transmitter 1155 may transmit, to the UE, a grant for a data communication between the UE and the target base station based on a completion of the handover procedure.

Figure 12:
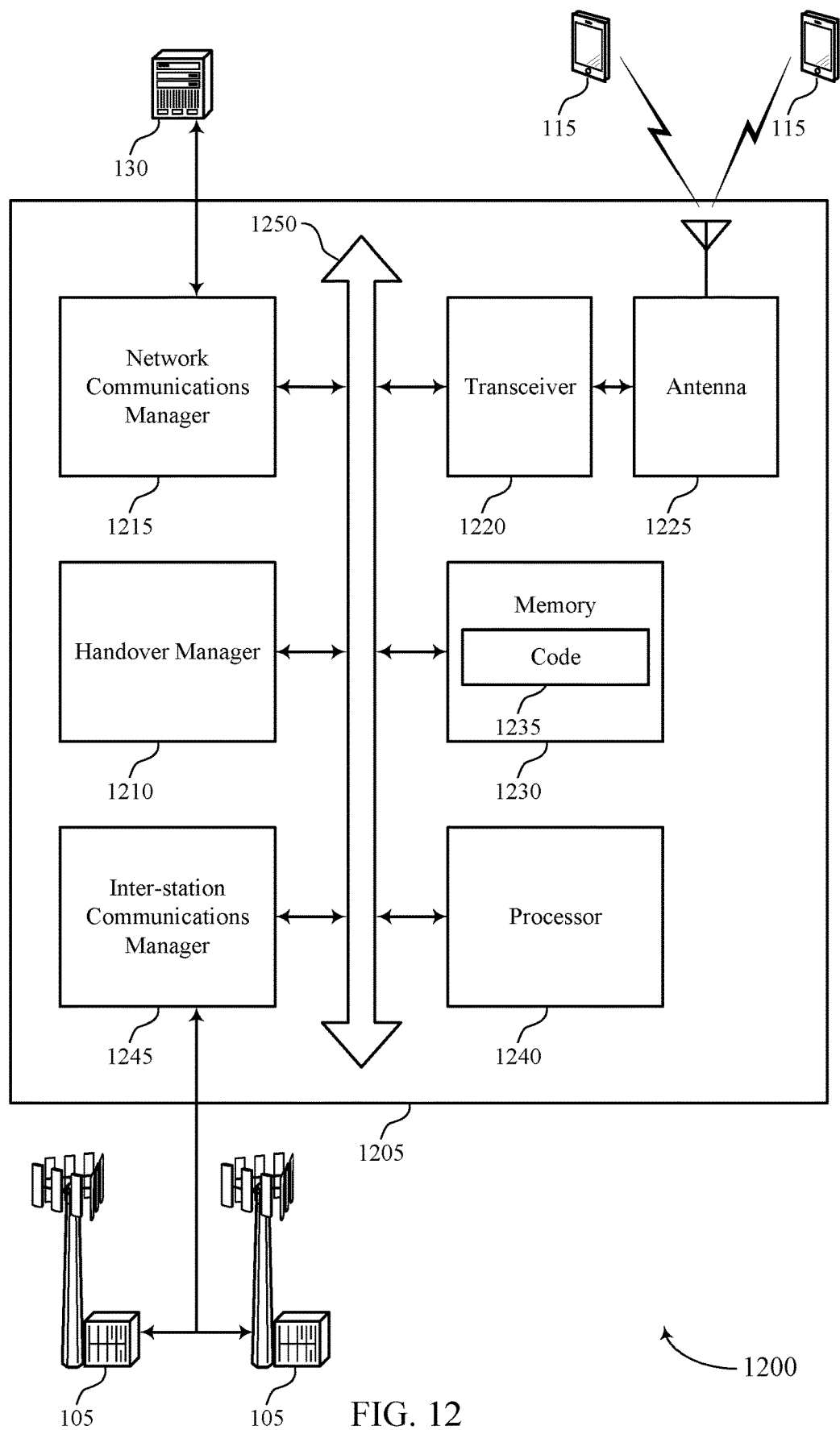
FIG. 12 shows a diagram of a system including a device that supports communications during handover procedure in accordance with aspects of the present disclosure.

FIG. 12 shows a diagram of a system 1200 including a device 1205 that supports communications during handover procedure in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a handover manager 1210, a network communications manager 1215, a transceiver 1220, an antenna 1225, memory 1230, a processor 1240, and an inter-station communications manager 1245. These components may be in electronic communication via one or more buses (e.g., bus 1250).

In some cases, for example when operating at a source base station, the handover manager 1210 may identify a UE for handover from the source base station to a target base station via a handover procedure, identify a set of radio bearers for configuring as split radio bearers for the handover procedure, transmit a handover request to the target base station requesting configuration of the set of radio bearers as split radio bearers, receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station, and communicate with the UE via at least one radio bearer of the subset of the radio bearers during the handover procedure.

In some examples, when operating at a target base station, the handover manager 1210 may also receive, from a source base station, a handover request for handover of a UE from the source base station to the target base station in accordance with a handover procedure, the handover request requesting configuration of a set of radio bearers as split radio bearers for the handover procedure, determine one or more radio bearers of the set of radio bearers for configuration as split radio bearers for the handover procedure, transmit a response to the handover request to the source base station, where the response indicates the one or more radio bearers for configuration as split radio bearers for the handover procedure, the split radio bearers being used to communicate data streams during the handover procedure between the UE and both the source base station and the target base station, and communicate with the UE via the one or more radio bearers during the handover procedure.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the device 1205 may include a single antenna 1225, or the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting communications during handover procedure).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
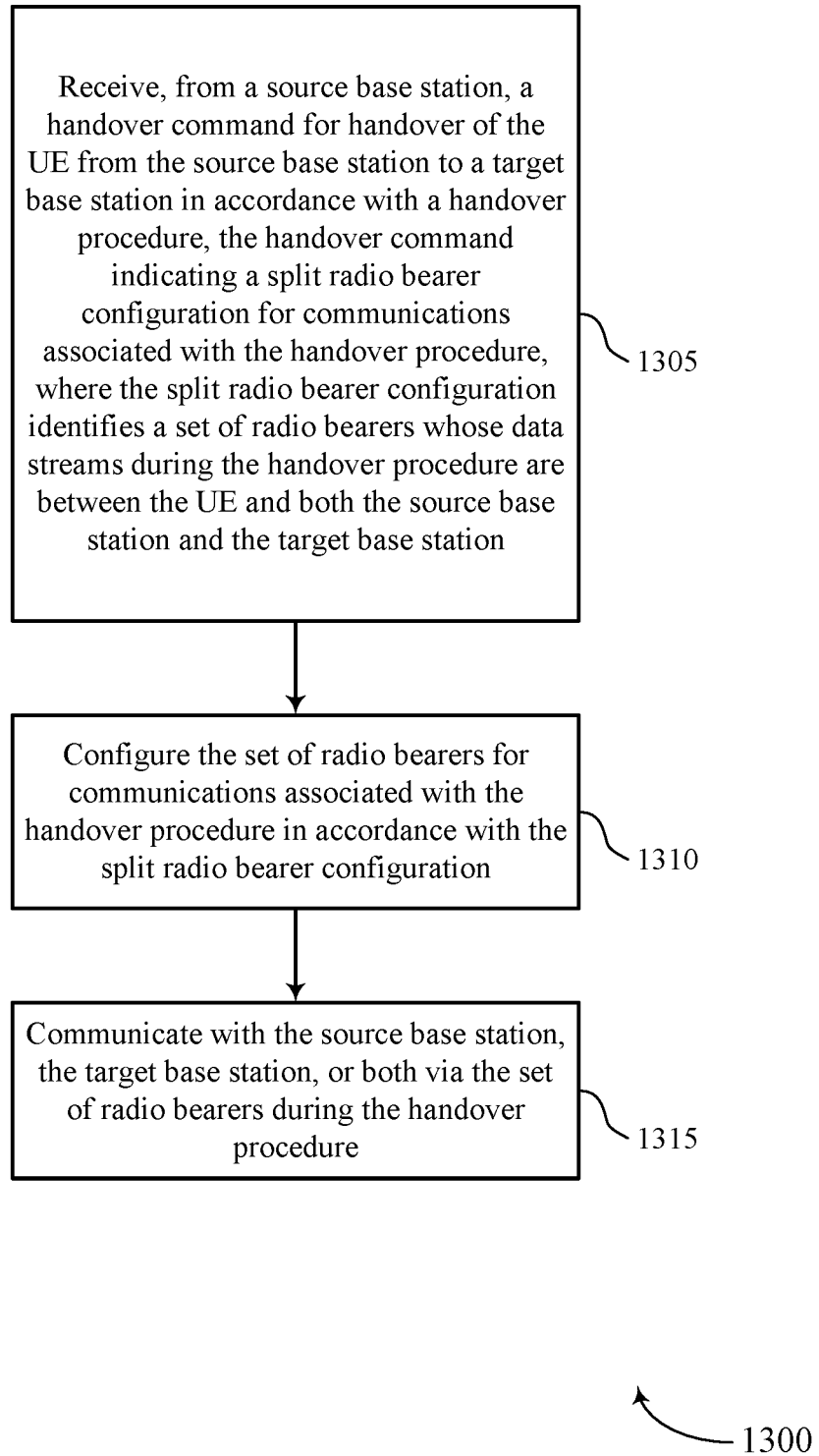
FIGS. 13 through 19 show flowcharts illustrating methods that support communications during handover procedure in accordance with aspects of the present disclosure.

FIG. 13 shows a flowchart illustrating a method 1300 that supports communications during handover procedure in accordance with aspects of the present disclosure. The operations of method 1300 may be implemented by a UE 115 or its components as described herein. For example, the operations of method 1300 may be performed by a handover manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. The operations of 1305 may be performed according to the methods described herein. In some examples, aspects of the operations of 1305 may be performed by a command receiver as described with reference to FIGS. 5 through 8.

At 1310, the UE may configure the set of radio bearers for communications associated with the handover procedure in accordance with the split radio bearer configuration. The operations of 1310 may be performed according to the methods described herein. In some examples, aspects of the operations of 1310 may be performed by a bearer configuration manager as described with reference to FIGS. 5 through 8.

At 1315, the UE may communicate with the source base station, the target base station, or both via the set of radio bearers during the handover procedure. The operations of 1315 may be performed according to the methods described herein. In some examples, aspects of the operations of 1315 may be performed by a communications module as described with reference to FIGS. 5 through 8.

Figure 14:
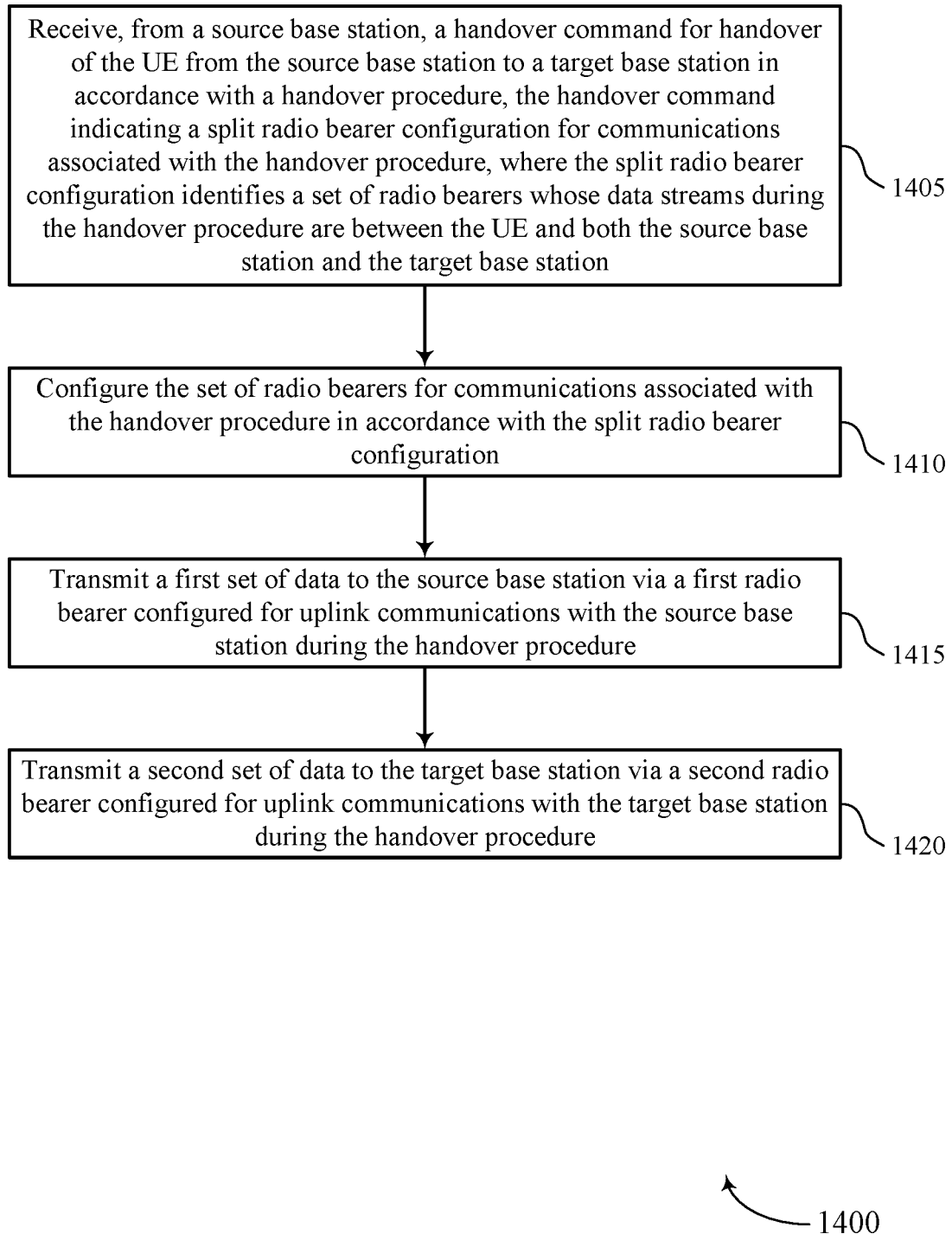

FIG. 14 shows a flowchart illustrating a method 1400 that supports communications during handover procedure in accordance with aspects of the present disclosure. The operations of method 1400 may be implemented by a UE 115 or its components as described herein. For example, the operations of method 1400 may be performed by a handover manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. The operations of 1405 may be performed according to the methods described herein. In some examples, aspects of the operations of 1405 may be performed by a command receiver as described with reference to FIGS. 5 through 8.

At 1410, the UE may configure the set of radio bearers for communications associated with the handover procedure in accordance with the split radio bearer configuration. The operations of 1410 may be performed according to the methods described herein. In some examples, aspects of the operations of 1410 may be performed by a bearer configuration manager as described with reference to FIGS. 5 through 8.

At 1415, the UE may transmit a first set of data to the source base station via a first radio bearer configured for uplink communications with the source base station during the handover procedure. The operations of 1415 may be performed according to the methods described herein. In some examples, aspects of the operations of 1415 may be performed by a data transmission module as described with reference to FIGS. 5 through 8.

At 1420, the UE may transmit a second set of data to the target base station via a second radio bearer configured for uplink communications with the target base station during the handover procedure. The operations of 1420 may be performed according to the methods described herein. In some examples, aspects of the operations of 1420 may be performed by a data transmission module as described with reference to FIGS. 5 through 8.

Figure 15:
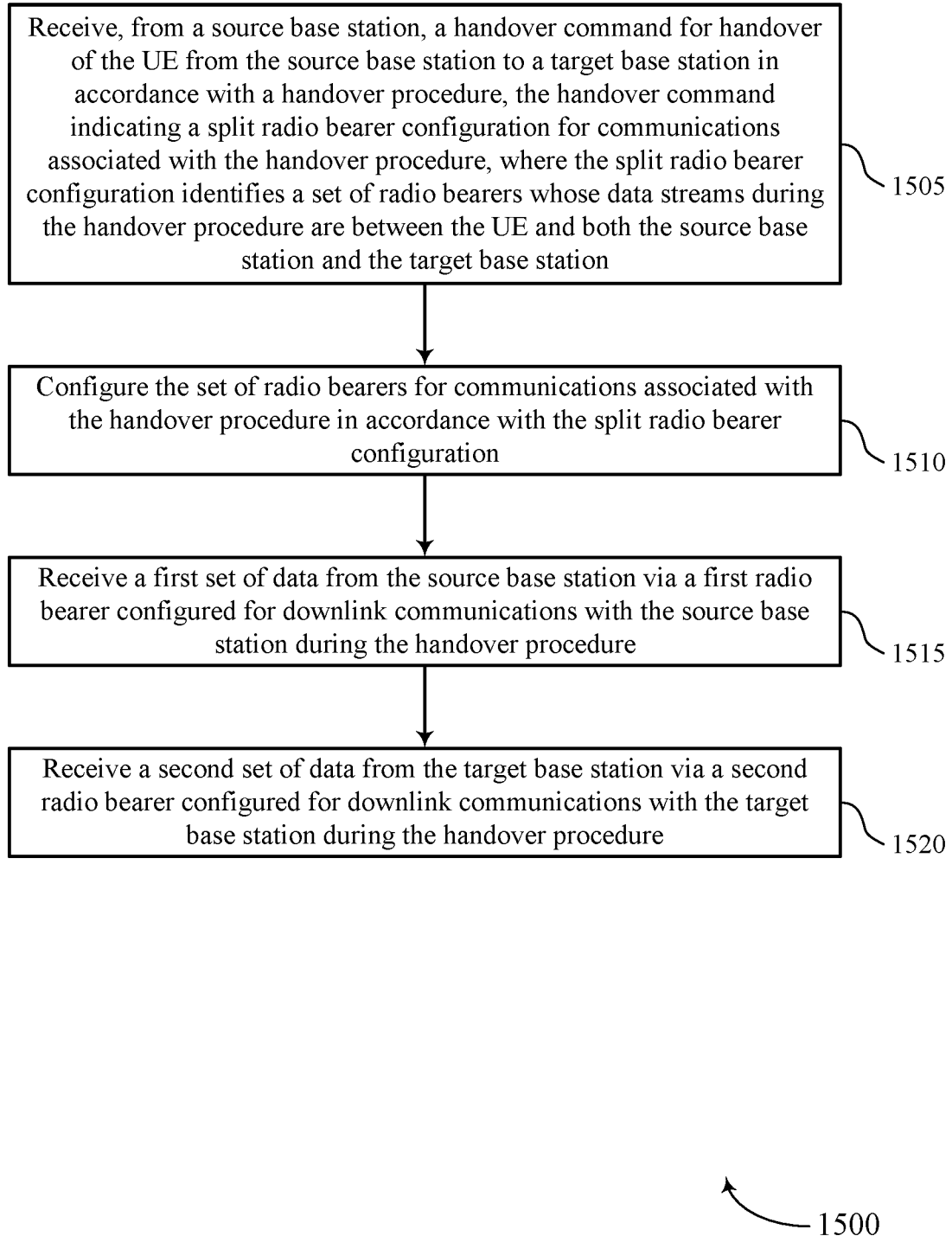

FIG. 15 shows a flowchart illustrating a method 1500 that supports communications during handover procedure in accordance with aspects of the present disclosure. The operations of method 1500 may be implemented by a UE 115 or its components as described herein. For example, the operations of method 1500 may be performed by a handover manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. The operations of 1505 may be performed according to the methods described herein. In some examples, aspects of the operations of 1505 may be performed by a command receiver as described with reference to FIGS. 5 through 8.

At 1510, the UE may configure the set of radio bearers for communications associated with the handover procedure in accordance with the split radio bearer configuration. The operations of 1510 may be performed according to the methods described herein. In some examples, aspects of the operations of 1510 may be performed by a bearer configuration manager as described with reference to FIGS. 5 through 8.

At 1515, the UE may receive a first set of data from the source base station via a first radio bearer configured for downlink communications with the source base station during the handover procedure. The operations of 1515 may be performed according to the methods described herein. In some examples, aspects of the operations of 1515 may be performed by a data reception module as described with reference to FIGS. 5 through 8.

At 1520, the UE may receive a second set of data from the target base station via a second radio bearer configured for downlink communications with the target base station during the handover procedure. The operations of 1520 may be performed according to the methods described herein. In some examples, aspects of the operations of 1520 may be performed by a data reception module as described with reference to FIGS. 5 through 8.

Figure 16:
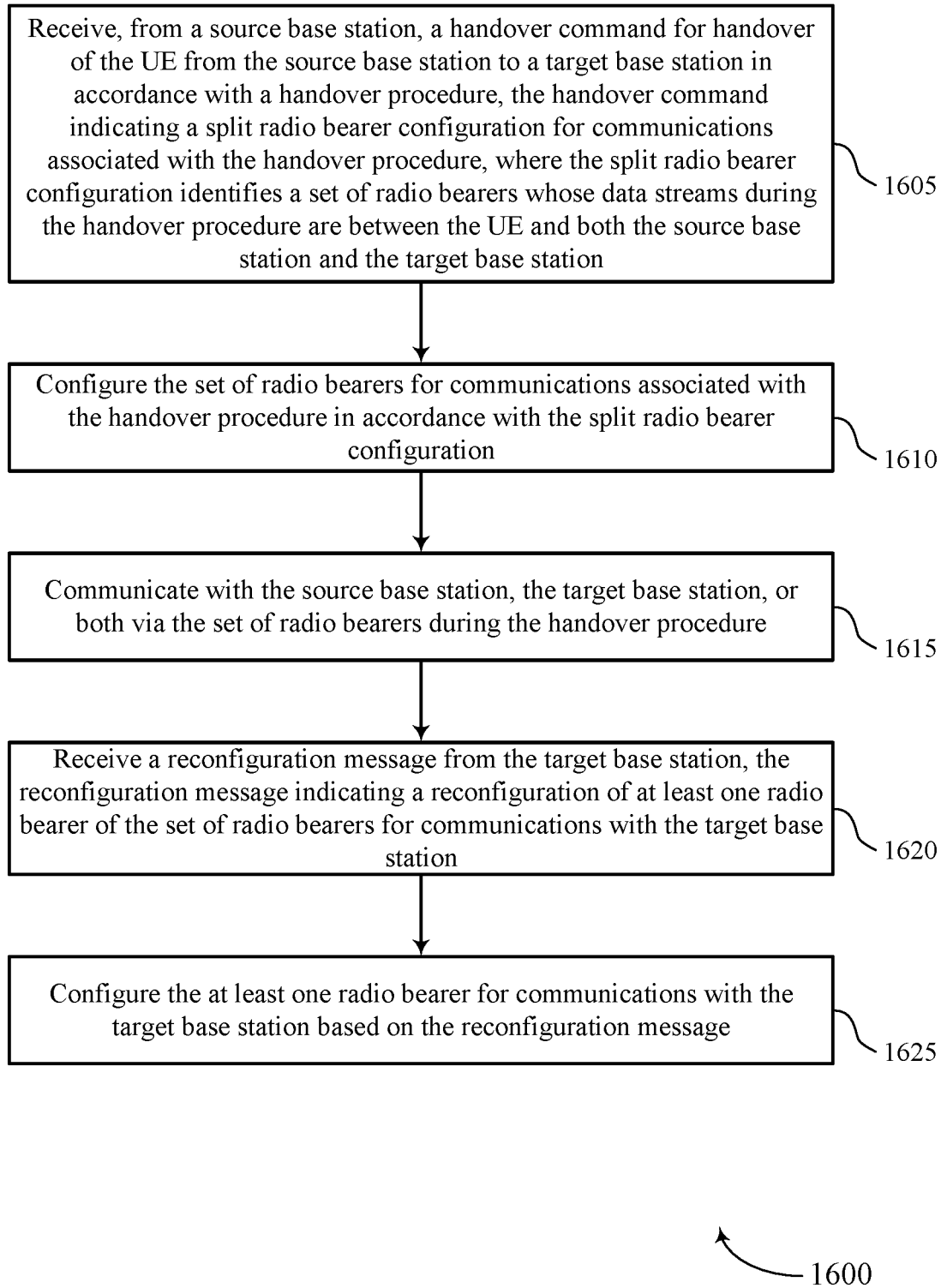

FIG. 16 shows a flowchart illustrating a method 1600 that supports communications during handover procedure in accordance with aspects of the present disclosure. The operations of method 1600 may be implemented by a UE 115 or its components as described herein. For example, the operations of method 1600 may be performed by a handover manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. The operations of 1605 may be performed according to the methods described herein. In some examples, aspects of the operations of 1605 may be performed by a command receiver as described with reference to FIGS. 5 through 8.

At 1610, the UE may configure the set of radio bearers for communications associated with the handover procedure in accordance with the split radio bearer configuration. The operations of 1610 may be performed according to the methods described herein. In some examples, aspects of the operations of 1610 may be performed by a bearer configuration manager as described with reference to FIGS. 5 through 8.

At 1615, the UE may communicate with the source base station, the target base station, or both via the set of radio bearers during the handover procedure. The operations of 1615 may be performed according to the methods described herein. In some examples, aspects of the operations of 1615 may be performed by a communications module as described with reference to FIGS. 5 through 8.

At 1620, the UE may receive a reconfiguration message from the target base station, the reconfiguration message indicating a reconfiguration of at least one radio bearer of the set of radio bearers for communications with the target base station. The operations of 1620 may be performed according to the methods described herein. In some examples, aspects of the operations of 1620 may be performed by a reconfiguration receiver as described with reference to FIGS. 5 through 8.

At 1625, the UE may configure the at least one radio bearer for communications with the target base station based on the reconfiguration message. The operations of 1625 may be performed according to the methods described herein. In some examples, aspects of the operations of 1625 may be performed by a bearer configuration manager as described with reference to FIGS. 5 through 8.

Figure 17:
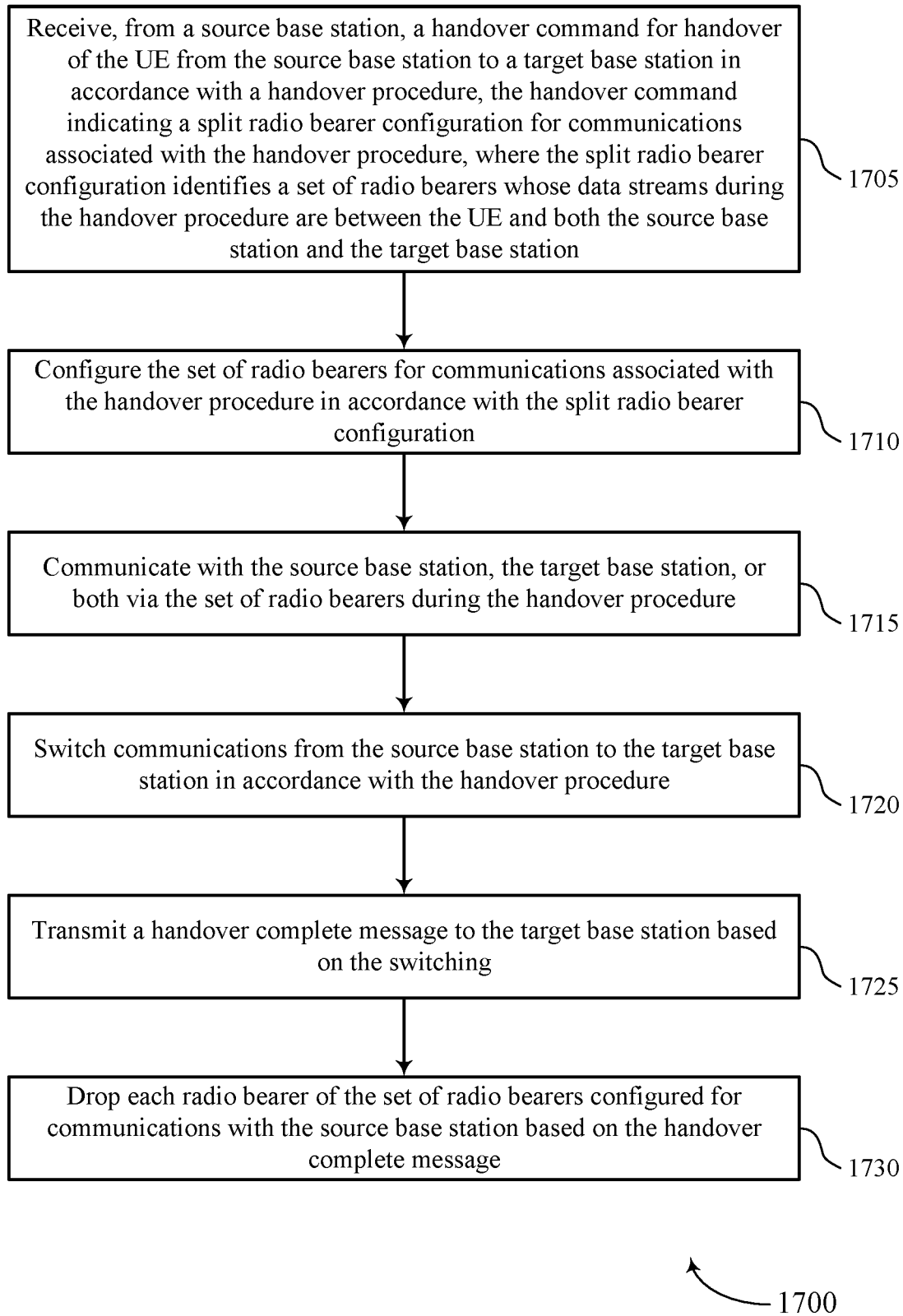

FIG. 17 shows a flowchart illustrating a method 1700 that supports communications during handover procedure in accordance with aspects of the present disclosure. The operations of method 1700 may be implemented by a UE 115 or its components as described herein. For example, the operations of method 1700 may be performed by a handover manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a source base station, a handover command for handover of the UE from the source base station to a target base station in accordance with a handover procedure, the handover command indicating a split radio bearer configuration for communications associated with the handover procedure, where the split radio bearer configuration identifies a set of radio bearers whose data streams during the handover procedure are between the UE and both the source base station and the target base station. The operations of 1705 may be performed according to the methods described herein. In some examples, aspects of the operations of 1705 may be performed by a command receiver as described with reference to FIGS. 5 through 8.

At 1710, the UE may configure the set of radio bearers for communications associated with the handover procedure in accordance with the split radio bearer configuration. The operations of 1710 may be performed according to the methods described herein. In some examples, aspects of the operations of 1710 may be performed by a bearer configuration manager as described with reference to FIGS. 5 through 8.

At 1715, the UE may communicate with the source base station, the target base station, or both via the set of radio bearers during the handover procedure. The operations of 1715 may be performed according to the methods described herein. In some examples, aspects of the operations of 1715 may be performed by a communications module as described with reference to FIGS. 5 through 8.

At 1720, the UE may switch communications from the source base station to the target base station in accordance with the handover procedure. The operations of 1720 may be performed according to the methods described herein. In some examples, aspects of the operations of 1720 may be performed by a communications module as described with reference to FIGS. 5 through 8.

At 1725, the UE may transmit a handover complete message to the target base station based on the switching. The operations of 1725 may be performed according to the methods described herein. In some examples, aspects of the operations of 1725 may be performed by a communications module as described with reference to FIGS. 5 through 8.

At 1730, the UE may drop each radio bearer of the set of radio bearers configured for communications with the source base station based on the handover complete message. The operations of 1730 may be performed according to the methods described herein. In some examples, aspects of the operations of 1730 may be performed by a bearer configuration manager as described with reference to FIGS. 5 through 8.

Figure 18:
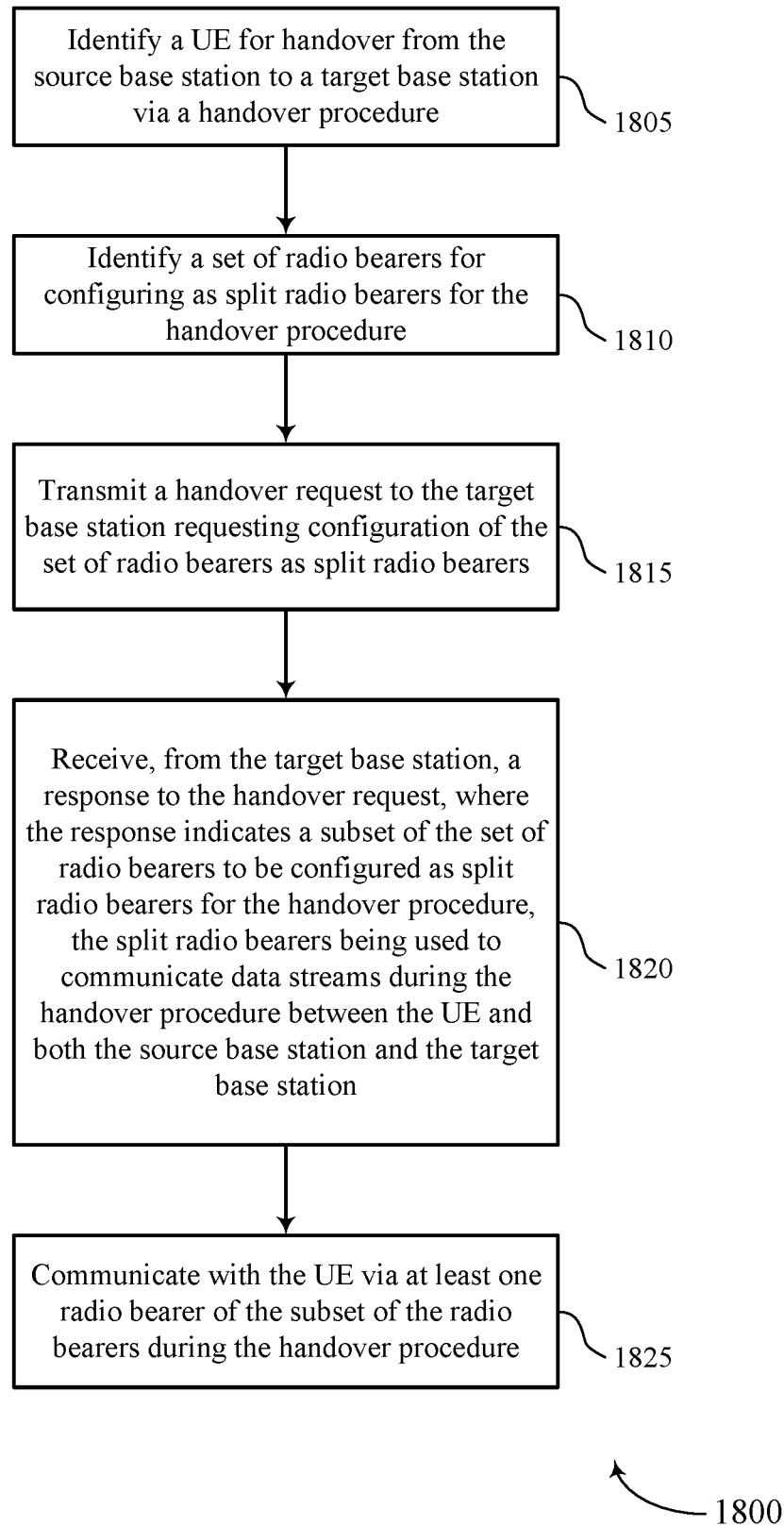

FIG. 18 shows a flowchart illustrating a method 1800 that supports communications during handover procedure in accordance with aspects of the present disclosure. The operations of method 1800 may be implemented by a base station 105 or its components as described herein. For example, the operations of method 1800 may be performed by a handover manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may identify a UE for handover from the source base station to a target base station via a handover procedure. The operations of 1805 may be performed according to the methods described herein. In some examples, aspects of the operations of 1805 may be performed by a handover component as described with reference to FIGS. 9 through 12.

At 1810, the base station may identify a set of radio bearers for configuring as split radio bearers for the handover procedure. The operations of 1810 may be performed according to the methods described herein. In some examples, aspects of the operations of 1810 may be performed by a bearer module as described with reference to FIGS. 9 through 12.

At 1815, the base station may transmit a handover request to the target base station requesting configuration of the set of radio bearers as split radio bearers. The operations of 1815 may be performed according to the methods described herein. In some examples, aspects of the operations of 1815 may be performed by a request transmitter as described with reference to FIGS. 9 through 12.

At 1820, the base station may receive, from the target base station, a response to the handover request, where the response indicates a subset of the set of radio bearers to be configured as split radio bearers for the handover procedure, the split radio bearers being used to communicate data streams during the handover procedure between the UE and both the source base station and the target base station. The operations of 1820 may be performed according to the methods described herein. In some examples, aspects of the operations of 1820 may be performed by a response receiver as described with reference to FIGS. 9 through 12.

At 1825, the base station may communicate with the UE via at least one radio bearer of the subset of the radio bearers during the handover procedure. The operations of 1825 may be performed according to the methods described herein. In some examples, aspects of the operations of 1825 may be performed by a communications component as described with reference to FIGS. 9 through 12.

Figure 19:
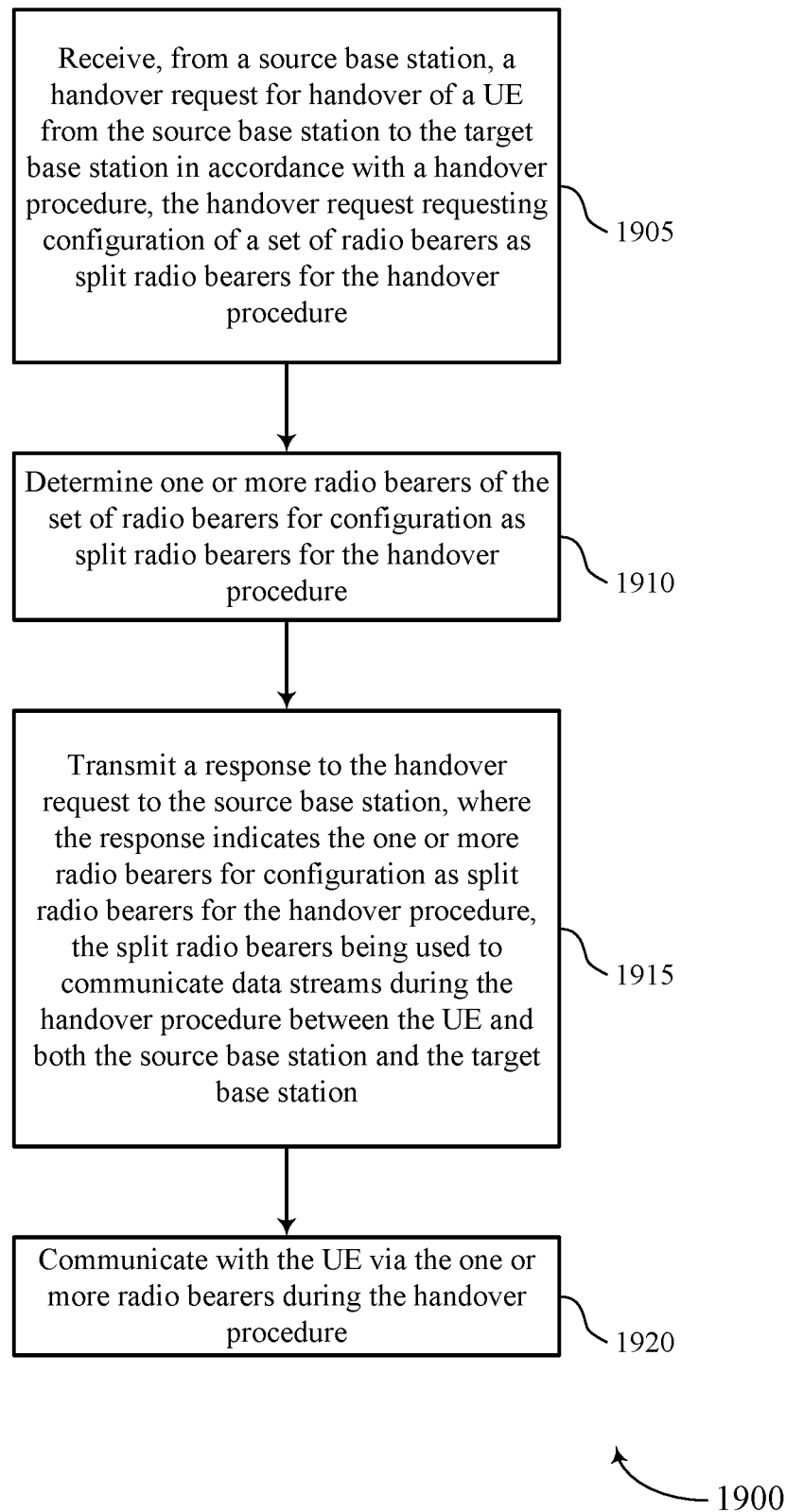

FIG. 19 shows a flowchart illustrating a method 1900 that supports communications during handover procedure in accordance with aspects of the present disclosure. The operations of method 1900 may be implemented by a base station 105 or its components as described herein. For example, the operations of method 1900 may be performed by a handover manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a source base station, a handover request for handover of a UE from the source base station to the target base station in accordance with a handover procedure, the handover request requesting configuration of a set of radio bearers as split radio bearers for the handover procedure. The operations of 1905 may be performed according to the methods described herein. In some examples, aspects of the operations of 1905 may be performed by a request receiver as described with reference to FIGS. 9 through 12.

At 1910, the base station may determine one or more radio bearers of the set of radio bearers for configuration as split radio bearers for the handover procedure. The operations of 1910 may be performed according to the methods described herein. In some examples, aspects of the operations of 1910 may be performed by a bearer module as described with reference to FIGS. 9 through 12.

At 1915, the base station may transmit a response to the handover request to the source base station, where the response indicates the one or more radio bearers for configuration as split radio bearers for the handover procedure, the split radio bearers being used to communicate data streams during the handover procedure between the UE and both the source base station and the target base station. The operations of 1915 may be performed according to the methods described herein. In some examples, aspects of the operations of 1915 may be performed by a response transmitter as described with reference to FIGS. 9 through 12.

At 1920, the base station may communicate with the UE via the one or more radio bearers during the handover procedure. The operations of 1920 may be performed according to the methods described herein. In some examples, aspects of the operations of 1920 may be performed by a communications component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Embodiment 1: A method for wireless communications at a UE, comprising: receiving, from a source base station, a handover command for handover of the UE from the source base station to a target base station in accordance with a handover procedure, the handover command indicating a split radio bearer configuration for communications associated with the handover procedure, wherein the split radio bearer configuration identifies a set of radio bearers whose data streams during the handover procedure are between the UE and both the source base station and the target base station; configuring the set of radio bearers for communications associated with the handover procedure in accordance with the split radio bearer configuration; and communicating with the source base station, the target base station, or both via the set of radio bearers during the handover procedure.

Embodiment 2: The method of embodiment 1, wherein communicating comprises: transmitting a first set of data to the source base station via a first radio bearer configured for uplink communications with the source base station during the handover procedure; and transmitting a second set of data to the target base station via a second radio bearer configured for uplink communications with the target base station during the handover procedure.

Embodiment 3: The method of any one of embodiments 1 or 2, wherein communicating comprises: receiving a first set of data from the source base station via a first radio bearer configured for downlink communications with the source base station during the handover procedure; and receiving a second set of data from the target base station via a second radio bearer configured for downlink communications with the target base station during the handover procedure.

Embodiment 4: The method of any one of embodiments 1 through 3, wherein configuring comprises: configuring a first downlink radio bearer for communications with the source base station during the handover procedure in accordance with the split radio bearer configuration; configuring a second downlink radio bearer for communications with the target base station during the handover procedure in accordance with the split radio bearer configuration; and configuring an uplink radio bearer for communications with the target base station during the handover procedure in accordance with a source to target switch configuration.

Embodiment 5: The method of any one of embodiments 1 through 4, further comprising: receiving a reconfiguration message from the target base station, the reconfiguration message indicating a reconfiguration of at least one radio bearer of the set of radio bearers for communications with the target base station; and configuring the at least one radio bearer for communications with the target base station based at least in part on the reconfiguration message.

Embodiment 6: The method of any one of embodiments 1 through 5, further comprising: receiving a reconfiguration message from the target base station, the reconfiguration message indicating a bearer reconfiguration for the UE; and dropping each radio bearer of the set of radio bearers configured for communications with the source base station based at least in part on the reconfiguration message.

Embodiment 7: The method of any one of embodiments 1 through 6, further comprising: switching communications from the source base station to the target base station in accordance with the handover procedure; transmitting a handover complete message to the target base station based at least in part on the switching; and dropping each radio bearer of the set of radio bearers configured for communications with the source base station based at least in part on the handover complete message.

Embodiment 8: The method of any one of embodiments 1 through 7, further comprising: receiving, from the target base station, a grant for a data communication associated with the target base station; and dropping each radio bearer of the set of radio bearers configured for communications with the source base station based at least in part on the grant.

Embodiment 9: The method of any one of embodiments 1 through 8, further comprising: receiving a reconfiguration message from the source base station based at least in part on a failure of the handover procedure, the reconfiguration message indicating a reconfiguration of at least one radio bearer of the set of radio bearers for communications with the source base station; and configuring the at least one radio bearer for communications with the source base station based at least in part on the reconfiguration message.

Embodiment 10: The method of embodiment 9, further comprising: transmitting a message to the source base station indicating the failure of the handover procedure, wherein the reconfiguration message is received from the source base station in response to the message.

Embodiment 11: The method of any one of embodiments 1 through 10, wherein configuring the set of radio bearers comprises: configuring a first radio bearer for communications with the source base station during the handover procedure; and configuring a second radio bearer for communications with the target base station during the handover procedure.

Embodiment 12: The method of any one of embodiments 1 through 11, further comprising: receiving the handover command from the source base station via an RRC message.

Embodiment 13: The method of embodiment 12, wherein the handover command is generated at the target base station.

Embodiment 14: The method of any one of embodiments 1 through 13, wherein the set of radio bearers are associated with low latency communications.

Embodiment 15: A method for wireless communications at a source base station, comprising: identifying a UE for handover from the source base station to a target base station via a handover procedure; identifying a set of radio bearers for configuring as split radio bearers for the handover procedure; transmitting a handover request to the target base station requesting configuration of the set of radio bearers as split radio bearers; receiving, from the target base station, a response to the handover request, wherein the response indicates a subset of the set of radio bearers to be configured as split radio bearers for the handover procedure, the split radio bearers being used to communicate data streams during the handover procedure between the UE and both the source base station and the target base station; and communicating with the UE via at least one radio bearer of the subset of the radio bearers during the handover procedure.

Embodiment 16: The method of embodiment 15, further comprising: receiving a data packet from the UE via a radio bearer configured for uplink communications between the source base station and the UE; and transmitting, to the target base station, a message that includes a PDCP PDU associated with the data packet.

Embodiment 17: The method of any one of embodiments 15 or 16, further comprising: receiving a first data packet from the UE via a radio bearer configured for uplink communications between the source base station and the UE; receiving, from the target base station, a PDCP PDU associated with a second data packet of the UE; and transmitting, to a core network node, a message that includes a PDCP SDU comprising the first data packet and the PDCP PDU associated with the second data packet of the UE.

Embodiment 18: The method of any one of embodiments 15 through 17, further comprising: receiving, from the target base station, a PDCP PDU associated with a data packet of the UE; and transmitting, to the UE, a message that includes the PDCP PDU associated with the data packet via a radio bearer configured for downlink communications between the source base station and the UE.

Embodiment 19: The method of any one of embodiments 15 through 18, further comprising: receiving, at a PDCP layer of the source base station, a PDCP SDU associated with a set of data for the UE; transmitting, to the target base station, a first PDCP PDU comprising a first subset of the data for the UE; and transmitting, to the UE via a radio bearer configured for downlink communications between the source base station and the UE, a message that includes a second PDCP PDU comprising a second subset of the data for the UE.

Embodiment 20: The method of any one of embodiments 15 through 19, further comprising: configuring at least one radio bearer of the subset of the set of radio bearers for communications with the source base station based at least in part on the response to the handover request.

Embodiment 21: The method of any one of embodiments 15 through 20, further comprising: transmitting, to the UE, a handover command for handover of the UE from the source base station to the target base station, the handover command indicating a split radio bearer configuration for the at least one radio bearer.

Embodiment 22: The method of any one of embodiments 15 through 21, further comprising: transmitting, to the UE, a handover command for handover of the UE from the source base station to the target base station, the handover command indicating a split radio bearer configuration for at least one downlink radio bearer and a source to target switch configuration for an uplink bearer.

Embodiment 23: The method of any one of embodiments 15 through 22, further comprising: configuring a master cell group radio bearer for communications associated with the handover procedure; and communicating with the UE via the master cell group radio bearer.

Embodiment 24: The method of any one of embodiments 15 through 23, further comprising: transmitting a reconfiguration message to the UE based at least in part on a failure of the handover procedure, the reconfiguration message indicating a reconfiguration of the subset of radio bearers for communications with the source base station.

Embodiment 25: The method of embodiment 24, further comprising: receiving a message from the UE or target base station indicating the failure of the handover procedure, wherein the reconfiguration message is transmitted to the UE in response to the message.

Embodiment 26: The method of any one of embodiments 15 through 25, further comprising: dropping each radio bearer of the subset of radio bearers configured for communications between the source base station and the UE based at least in part on a completion of the handover procedure.

Embodiment 27: The method of any one of embodiments 15 through 26, wherein the set of radio bearers identified for configuring as split radio bearers are associated with low latency communications.

Embodiment 28: A method for wireless communications at a target base station, comprising: receiving, from a source base station, a handover request for handover of a user equipment (UE) from the source base station to the target base station in accordance with a handover procedure, the handover request requesting configuration of a set of radio bearers as split radio bearers for the handover procedure; determining one or more radio bearers of the set of radio bearers for configuration as split radio bearers for the handover procedure; transmitting a response to the handover request to the source base station, wherein the response indicates the one or more radio bearers for configuration as split radio bearers for the handover procedure, the split radio bearers being used to communicate data streams during the handover procedure between the UE and both the source base station and the target base station; and communicating with the UE via the one or more radio bearers during the handover procedure.

Embodiment 29: The method of embodiment 28, further comprising: receiving a first data packet from the UE via a radio bearer configured for uplink communications between the target base station and the UE; receiving, from the source base station, a message that includes a PDCP PDU associated with a second data packet of the UE; and transmitting, to a core network node, a message that includes a PDCP SDU comprising the first data packet and the PDCP PDU associated with the second data packet of the UE.

Embodiment 30: The method of any one of embodiments 28 or 29, further comprising: receiving a data packet from the UE via a radio bearer configured for uplink communications between the target base station and the UE; and transmitting, to the source base station, a PDCP PDU associated with the data packet of the UE.

Embodiment 31: The method of any one of embodiments 28 through 30, further comprising: receiving, at a PDCP layer of the target base station, a PDCP SDU associated with a set of data for the UE; transmitting, to the source base station, a PDCP PDU comprising a first subset of the data for the UE; and transmitting, to the UE via a radio bearer configured for downlink communications between the target base station and the UE, a message that includes a second PDCP PDU comprising a second subset of the data for the UE.

Embodiment 32: The method of any one of embodiments 28 through 31, further comprising: receiving, from the target base station, a PDCP PDU associated with a data packet of the UE; and transmitting, to the UE, a message that includes the PDCP PDU associated with the data packet via a radio bearer configured for downlink communications between the target base station and the UE.

Embodiment 33: The method of any one of embodiments 28 through 32, further comprising: configuring at least one radio bearer of the subset of the set of radio bearers for communications between the UE and the target base station based at least in part on the response to the handover request.

Embodiment 34: The method of any one of embodiments 28 through 33, further comprising: configuring a secondary cell group radio bearer for communications associated with the handover procedure; and communicating with the UE via the secondary cell group bearer.

Embodiment 35: The method of any one of embodiments 28 through 34, further comprising: receiving a handover complete message from the UE based at least in part on a completion of the handover procedure; and transmitting a reconfiguration message to the UE based at least in part on the handover complete message, the reconfiguration message indicating a reconfiguration of at least one radio bearer of the set of radio bearers for communications with the target base station.

Embodiment 36: The method of any one of embodiments 28 through 35, further comprising: transmitting, to the UE, a grant for a data communication between the UE and the target base station based at least in part on a completion of the handover procedure; and communicating with the UE based at least in part on the grant.

Embodiment 37: The method of any one of embodiments 28 through 36, further comprising: generating a handover command for the UE based at least in part on the handover request from the source base station; and transmitting an indication of the handover command to the source base station.

Embodiment 38: The method of any one of embodiments 28 through 37, further comprising: transmitting a message to the source base station indicating a failure of the handover procedure based at least in part on an incomplete handover procedure after a given time duration.

Embodiment 39: An apparatus comprising at least one means for performing a method of any of embodiments 1 to 14.

Embodiment 40: An apparatus for wireless communications comprising a processor; memory in electronic communication with the processor; and instructions stored in the memory and executable by the processor to cause the apparatus to perform a method of any of embodiments 1 to 14.

Embodiment 41: A non-transitory computer-readable medium storing code for wireless communications, the code comprising instructions executable by a processor to perform a method of any of embodiments 1 to 14.

Embodiment 42: An apparatus comprising at least one means for performing a method of any of embodiments 15 to 27.

Embodiment 43: An apparatus for wireless communications comprising a processor; memory in electronic communication with the processor; and instructions stored in the memory and executable by the processor to cause the apparatus to perform a method of any of embodiments 15 to 27.

Embodiment 44: A non-transitory computer-readable medium storing code for wireless communications, the code comprising instructions executable by a processor to perform a method of any of embodiments 15 to 27.

Embodiment 45: An apparatus comprising at least one means for performing a method of any of embodiments 28 to 38.

Embodiment 46: An apparatus for wireless communications comprising a processor; memory in electronic communication with the processor; and instructions stored in the memory and executable by the processor to cause the apparatus to perform a method of any of embodiments 28 to 38.

Embodiment 47: A non-transitory computer-readable medium storing code for wireless communications, the code comprising instructions executable by a processor to perform a method of any of embodiments 28 to 38.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a source base station, a handover command for handover of the UE from the source base station to a target base station in accordance with a handover procedure, the handover command indicating a split radio bearer configuration for communications associated with the handover procedure, wherein the split radio bearer configuration identifies a set of radio bearers whose data streams during the handover procedure are between the UE and both the source base station and the target base station, and wherein each respective radio bearer is to be configured for uplink communications, downlink communications, or both, based at least in part on the split radio bearer configuration;

configuring the set of radio bearers for communications associated with the handover procedure in accordance with the split radio bearer configuration; and communicating with the source base station, the target base station, or both via the set of radio bearers during the handover procedure.

2. The method of claim 1, wherein communicating comprises:

transmitting a first set of data to the source base station via a first radio bearer configured for uplink communications with the source base station during the handover procedure; and transmitting a second set of data to the target base station via a second radio bearer configured for uplink communications with the target base station during the handover procedure.

3. The method of claim 1, wherein communicating comprises:

receiving a first set of data from the source base station via a first radio bearer configured for downlink communications with the source base station during the handover procedure; and receiving a second set of data from the target base station via a second radio bearer configured for downlink communications with the target base station during the handover procedure.

4. The method of claim 1, wherein configuring comprises:

configuring a first downlink radio bearer for communications with the source base station during the handover procedure in accordance with the split radio bearer configuration;

configuring a second downlink radio bearer for communications with the target base station during the handover procedure in accordance with the split radio bearer configuration; and configuring an uplink radio bearer for communications with the target base station during the handover procedure in accordance with a source to target switch configuration.

5. The method of claim 1, further comprising:

receiving a reconfiguration message from the target base station, the reconfiguration message indicating a reconfiguration of at least one radio bearer of the set of radio bearers for communications with the target base station; and configuring the at least one radio bearer for communications with the target base station based at least in part on the reconfiguration message.

6. The method of claim 1, further comprising:

receiving a reconfiguration message from the target base station, the reconfiguration message indicating a reconfiguration of the set of radio bearers for communications with the target base station;

configuring the set of radio bearers for communications with the target base station based at least in part on the reconfiguration message; and dropping each radio bearer of the set of radio bearers configured for communications with the source base station based at least in part on the reconfiguration message.

7. The method of claim 1, further comprising:

switching communications from the source base station to the target base station in accordance with the handover procedure;

transmitting a handover complete message to the target base station based at least in part on the switching; and dropping each radio bearer of the set of radio bearers configured for communications with the source base station based at least in part on the handover complete message.

8. The method of claim 1, further comprising:

receiving, from the target base station, a grant for a data communication associated with the target base station; and dropping each radio bearer of the set of radio bearers configured for communications with the source base station based at least in part on the grant.

9. The method of claim 1, further comprising:

receiving a reconfiguration message from the source base station based at least in part on a failure of the handover procedure, the reconfiguration message indicating a reconfiguration of at least one radio bearer of the set of radio bearers for communications with the source base station; and configuring the at least one radio bearer for communications with the source base station based at least in part on the reconfiguration message.

10. The method of claim 9, further comprising:

transmitting a message to the source base station indicating the failure of the handover procedure, wherein the reconfiguration message is received from the source base station in response to the message.

11. The method of claim 1, wherein configuring the set of radio bearers comprises:

configuring a first radio bearer for communications with the source base station during the handover procedure; and configuring a second radio bearer for communications with the target base station during the handover procedure.

12. The method of claim 1, further comprising:

receiving the handover command from the source base station via a radio resource control (RRC) message.

13. The method of claim 12, wherein the handover command is generated at the target base station.

14. The method of claim 1, wherein the set of radio bearers are associated with low latency communications.

15. A method for wireless communications at a source base station, comprising:

identifying a user equipment (UE) for handover from the source base station to a target base station via a handover procedure;

identifying a set of radio bearers for configuring as split radio bearers for the handover procedure;

transmitting a handover request to the target base station requesting configuration of the set of radio bearers as the split radio bearers;

receiving, from the target base station, a response to the handover request, wherein the response indicates a subset of the set of radio bearers to be configured as the split radio bearers for the handover procedure, and wherein each respective radio bearer of the subset is to be configured for uplink communications, downlink communications, or both, the split radio bearers being used to communicate data streams during the handover procedure between the UE and both the source base station and the target base station; and communicating with the UE via at least one radio bearer of the subset of the set of radio bearers during the handover procedure.

16. The method of claim 15, further comprising:
receiving a data packet from the UE via a radio bearer configured for uplink communications between the source base station and the UE; and
transmitting, to the target base station, a message that includes a packet data convergence protocol (PDCP) protocol data unit (PDU) associated with the data packet.

17. The method of claim 15, further comprising:
receiving a first data packet from the UE via a radio bearer configured for uplink communications between the source base station and the UE;
receiving, from the target base station, a packet data convergence protocol (PDCP) protocol data unit (PDU) associated with a second data packet of the UE; and
transmitting, to a core network node, a message that includes a PDCP service data unit (SDU) comprising the first data packet and the PDCP PDU associated with the second data packet of the UE.

18. The method of claim 15, further comprising:
receiving, from the target base station, a packet data convergence protocol (PDCP) protocol data unit (PDU) associated with a data packet of the UE; and
transmitting, to the UE, a message that includes the PDCP PDU associated with the data packet via a radio bearer configured for downlink communications between the source base station and the UE.

19. The method of claim 15, further comprising:
receiving, at a packet data convergence protocol (PDCP) layer of the source base station, a PDCP service data unit (SDU) associated with a set of data for the UE;
transmitting, to the target base station, a first PDCP protocol data unit (PDU) comprising a first subset of the set of data for the UE; and
transmitting, to the UE via a radio bearer configured for downlink communications between the source base station and the UE, a message that includes a second PDCP PDU comprising a second subset of the set of data for the UE.

20. The method of claim 15, further comprising:
configuring at least one radio bearer of the subset of the set of radio bearers for communications with the source base station based at least in part on the response to the handover request.

21. The method of claim 15, further comprising:
transmitting, to the UE, a handover command for handover of the UE from the source base station to the target base station, the handover command indicating a split radio bearer configuration for the at least one radio bearer.

22. The method of claim 15, further comprising:
transmitting, to the UE, a handover command for handover of the UE from the source base station to the target base station, the handover command indicating a split radio bearer configuration for at least one downlink radio bearer and a source to target switch configuration for an uplink bearer.

23. The method of claim 15, further comprising:
configuring a master cell group radio bearer for communications associated with the handover procedure; and
communicating with the UE via the master cell group radio bearer.

24. The method of claim 15, further comprising:
transmitting a reconfiguration message to the UE based at least in part on a failure of the handover procedure, the reconfiguration message indicating a reconfiguration of the subset of the set of radio bearers for communications with the source base station.

25. The method of claim 24, further comprising:
receiving a message from the UE or the target base station indicating the failure of the handover procedure, wherein the reconfiguration message is transmitted to the UE in response to the message.

26. The method of claim 15, further comprising:
dropping each radio bearer of the subset of the set of radio bearers configured for communications between the source base station and the UE based at least in part on a completion of the handover procedure.

27. The method of claim 15, wherein the set of radio bearers identified for configuring as the split radio bearers are associated with low latency communications.

28. An apparatus for wireless communications at a user equipment (UE), comprising: a processor, memory coupled with the processor; and instructions stored in the memory and executable by the processor to cause the apparatus to:
receive, from a source base station, a handover command for handover of the UE from the source base station to a target base station in accordance with a handover procedure, the handover command indicating a split radio bearer configuration for communications associated with the handover procedure, wherein the split radio bearer configuration identifies a set of radio bearers whose data streams during the handover procedure are between the UE and both the source base station and the target base station, and wherein each respective radio bearer is to be configured for uplink communications, downlink communications, or both, based at least in part on the split radio bearer configuration;
configure the set of radio bearers for communications associated with the handover procedure in accordance with the split radio bearer configuration; and
communicate with the source base station, the target base station, or both via the set of radio bearers during the handover procedure.

29. The apparatus of claim 28, wherein the instructions to communicate are further are executable by the processor to cause the apparatus to:
transmit a first set of data to the source base station via a first radio bearer configured for uplink communications with the source base station during the handover procedure; and
transmit a second set of data to the target base station via a second radio bearer configured for uplink communications with the target base station during the handover procedure.

30. An apparatus for wireless communications at a source base station, comprising: a processor, memory coupled with the processor; and instructions stored in the memory and executable by the processor to cause the apparatus to:
identify a user equipment (UE) for handover from the source base station to a target base station via a handover procedure;

identify a set of radio bearers for configuring as split radio bearers for the handover procedure;
transmit a handover request to the target base station requesting configuration of the set of radio bearers as the split radio bearers;
receive, from the target base station, a response to the handover request, wherein the response indicates a subset of the set of radio bearers to be configured as the split radio bearers for the handover procedure, and wherein each respective radio bearer of the subset is to be configured for uplink communications, downlink communications, or both, the split radio bearers being used to communicate data streams during the handover procedure between the UE and both the source base station and the target base station; and
communicate with the UE via at least one radio bearer of the subset of the set of radio bearers during the handover procedure.

* * * * *